US012750270B2

(12) United States Patent
Mondal et al.

(10) Patent No.: US 12,750,270 B2
(45) Date of Patent: Sep. 29, 2026

(54) METHOD AND APPARATUS FOR DETERMINING A FIRST CAUSAL MAP

(71) Applicant: Telefonaktiebolaget LM Ericsson (publ), Stockholm (SE)

(72) Inventors: Surajit Mondal, Bangalore (IN); Ayan Sen, Bangalore (IN); Devansh Jain, Rohtak (IN); Sayan Bose, Cossipore West Bengal (IN); Shikha Singh, Gurgaon Haryana (IN); Aruna Mani, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 5 days.

(21) Appl. No.: 18/577,732

(22) PCT Filed: Jul. 9, 2021

(86) PCT No.: PCT/EP2021/069147

§ 371 (c)(1),
(2) Date: Jan. 9, 2024

(87) PCT Pub. No.: WO2023/280421

PCT Pub. Date: Jan. 12, 2023

(65) Prior Publication Data

US 2024/0314018 A1 Sep. 19, 2024

(51) Int. Cl.
*H04L 41/0631* (2022.01)
*H04L 41/142* (2022.01)

(52) U.S. Cl.
CPC ........ *H04L 41/0631* (2013.01); *H04L 41/142* (2013.01)

(58) Field of Classification Search
CPC .......................... H04L 41/0831; H04L 41/142
See application file for complete search history.

(56) References Cited

U.S. PATENT DOCUMENTS

| | | | |
|---|---|---|---|
| 8,255,524 B2 | 8/2012 | Devitt | |
| 11,894,985 B1 * | 2/2024 | Shivrayan | H04L 41/0823 |

(Continued)

FOREIGN PATENT DOCUMENTS

| | | |
|---|---|---|
| EP | 3 764 592 A1 | 1/2021 |
| WO | 2017/215647 A1 | 12/2017 |

OTHER PUBLICATIONS

Zdravesvski et al., "Feature selectionand allocation to diverse subsets for multi-label lealrning problems with large datasets", 2014 Federated Conference on Computer Science and Information Systems, Sep. 7, 2014, IEEE Publishing.*

(Continued)

*Primary Examiner* — Todd L Barker

(74) *Attorney, Agent, or Firm* — Rothwell, Figg, Ernst & Manbeck, P.C.

(57) ABSTRACT

Embodiments described herein relate to a method and an apparatus for determining a first causal map for the root cause analysis of a primary event in a network environment. A method, implemented in an apparatus, comprises obtaining (302) a first data set, wherein each entry in the first data set comprises values of a plurality of features representative of the network environment, wherein the plurality of features comprises a primary feature representative of the primary event; for each first feature in a first subset of the plurality of features, performing (304) an independence test on the first data set to determine a relationship between the first feature and the primary feature; for each first feature in the first subset for which the independence test indicates a dependent relationship to the primary feature, performing (306) the independence test on the first data set to determine a relationship between the first feature and each second feature in a second subset of the plurality of features; and based on results of the steps of performing the independence test, determining (308) one or more pathways in the first causal map between at least one root cause for the primary event and the primary feature.

18 Claims, 24 Drawing Sheets

(56) References Cited

U.S. PATENT DOCUMENTS

| | | | | |
|---|---|---|---|---|
| 2009/0327195 | A1* | 12/2009 | Iscen | G06N 5/042 706/50 |
| 2017/0075749 | A1 | 3/2017 | Ambichl et al. | |
| 2019/0165988 | A1 | 5/2019 | Wang et al. | |
| 2020/0042426 | A1 | 2/2020 | Ambichl et al. | |
| 2022/0374784 | A1* | 11/2022 | Sharma | G06N 5/01 |
| 2023/0325269 | A1* | 10/2023 | Gusat | G06F 11/0709 714/2 |
| 2024/0223435 | A1* | 7/2024 | Chan | H04L 41/0631 |

OTHER PUBLICATIONS

Khaire et al, "Optimizing Feature Selectoin Parameters using Statistically Equivalent Signature (SES) Algorithm", 2019 4th International Conference on Information Systems and Computer Networks, Nov. 2019, IEEE Publishing.*

Regier et al, "TCMIL a non-parametric mutual-dependence estimator for multivariate continuous distributions", Jan. 30, 2020.*

Milliken et al, "Ensemble learning utilising feature pairings for intrusion detection" 2015 World Congress on Internet Security, Oct. 1, 2015, IEEE Publishing.*

Herbert et al., "Testing for Feature RelevanceL The Harvest Algorithm" Sep. 30, 2017.*

International Search Report and Written Opinion issued in International Application No. PCT/EP2021/069147 dated Mar. 23, 2022 (13 pages).

* cited by examiner

101

102

METHOD AND APPARATUS FOR DETERMINING A FIRST CAUSAL MAP

CROSS REFERENCE TO RELATED APPLICATIONS

This application is a 35 U.S.C. § 371 National Stage of International Patent Application No. PCT/EP2021/069147, filed 2021 Jul. 9.

TECHNICAL FIELD

Embodiments described herein relate to a method and apparatus for determining a first causal map for the root cause analysis of a primary event in a network environment.

Background

Continuous optimization of the mobile communication network is the standard process to maintain and then improve the network performance. This ensures the best possible end-user experience, which is one of the major factors that drives business growth for any mobile communication service provider in a given market. The network optimization process, in general, comprises various corrective actions within the network nodes, and tuning of network features and parameters. Both accurate identification of problems and accurate determination of the most appropriate corrective actions (and/or determination of the appropriate set of features and parameters to be tuned, and the associated tuning required) may be considered the most important tasks in the optimization process.

At present, multiple methods exist and are in use to identify the problems related to network performance. These methods can be broadly categorized as Rule-based methods and ML-based methods. The rule-based methods perform checks and/or internal correlation based on built-in logic which are derived based on domain knowledge, technical product description, prior established relationships, and/or historical data. These rules are generally implemented or realized in the form of if-then-else conditions with static thresholds or values on performance metrics and configuration data, whose influencing relationship and labeling of cause-effect is prior known information.

Other popular techniques involve the use of different types of classification machine learning (ML) models which are trained based on data labeled with known problems.

The determination of the appropriate corrective actions in known methods is predominantly based on knowledge of the product, technology, protocols, etc., and deduced from the prior correlation of events with various observations.

In a real-world deployment, for an efficient and accurate solution, statistical approaches overwhelm other techniques. Statistical features of data can be used to detect association patterns between features and reduce the uncertainty about the directionality of the associations. Such uncertainly may arise due to indistinguishability of which feature is the cause and which feature is the effect. Statistical analysis may also address the problem of some features not being under purview as the relative causal effect is amenable to statistical analysis.

For example, US20170075749A1 discloses estimating causal relationships between events based on heterogeneous monitoring data.

SUMMARY

According to some embodiments there is provided a method, implemented in an apparatus, for determining a first causal map for the root cause analysis of a primary event in a network environment. The method comprises obtaining a first data set, wherein each entry in the first data set comprises values of a plurality of features representative of the network environment, wherein the plurality of features comprises a primary feature representative of the primary event; for each first feature in a first subset of the plurality of features, performing an independence test on the first data set to determine a relationship between the first feature and the primary feature; for each first feature in the first subset for which the independence test indicates a dependent relationship to the primary feature, performing the independence test on the first data set to determine a relationship between the first feature and each second feature in a second subset of the plurality of features; and based on results of the steps of performing the independence test, determining one or more pathways in the first causal map between at least one root cause for the primary event and the primary feature.

According to some embodiments there is provided an apparatus for determining a first causal map for the root cause analysis of a primary event in a network environment. The apparatus comprises processing circuitry configured to cause the apparatus to obtain a first data set, wherein each entry in the first data set comprises values of a plurality of features representative of the network environment, wherein the plurality of features comprises a primary feature representative of the primary event; for each first feature in a first subset of the plurality of features, perform an independence test on the first data set to determine a relationship between the first feature and the primary feature; for each first feature in the first subset for which the independence test indicates a dependent relationship to the primary feature, perform the independence test on the first data set to determine a relationship between the first feature and each second feature in a second subset of the plurality of features; and based on results of the steps of performing the independence test, determine one or more pathways in the first causal map between at least one root cause for the primary event and the primary feature.

According to some embodiments there is provided a computer program comprising instructions which, when executed on at least one processor, cause the at least one processor to carry out a method as described above.

According to some embodiments there is provided a computer program product comprising non transitory computer readable media having stored thereon a computer program as described above.

Embodiments described herein provide a causal map that is capable of explaining the underlying reasons behind an event, beyond just a root cause. This explanation can then help to determine suitable corrective actions that may be taken in the network in response to occurrence of the event.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
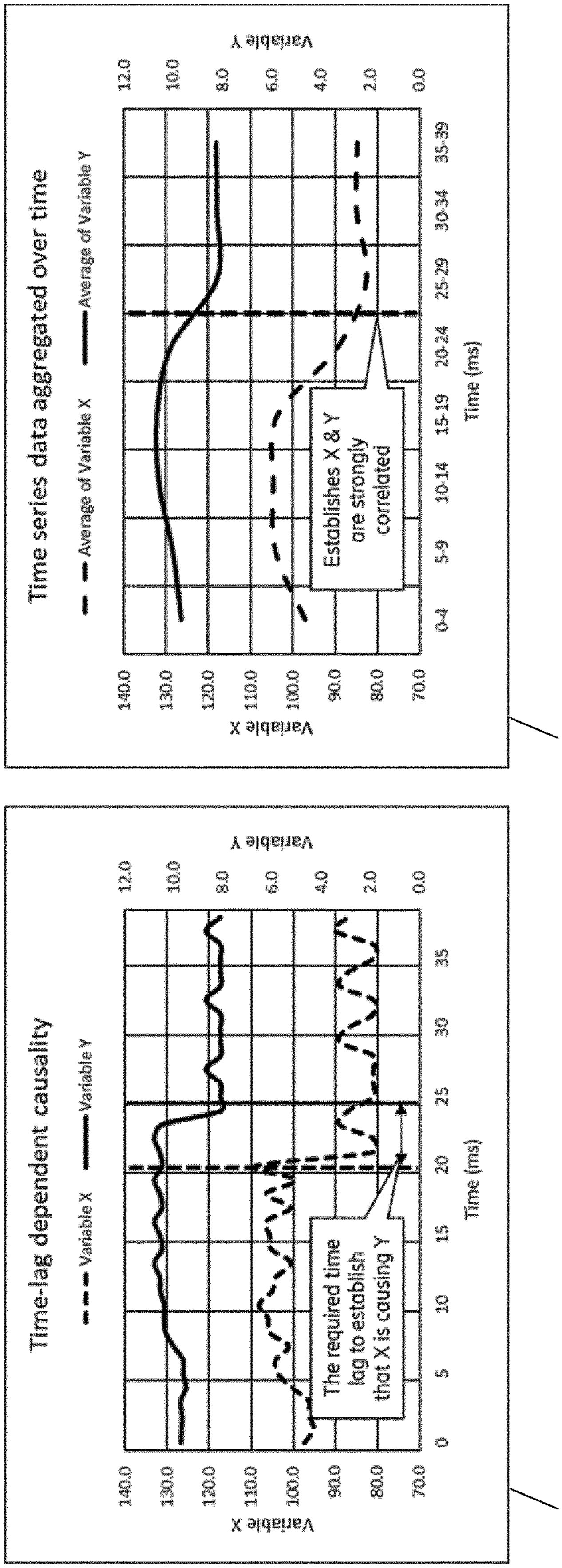
FIG. 1 illustrates a limitation of time aggregated data.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Previous solutions suffered from some limitations. For example, previous solutions, such as those mentioned above, can associate two features, and establish their directional relationship e.g. which feature is the cause and which is the effect. However, the practical limitation is that, to establish the fact that not only X and Y events are strongly correlated but also X causes Y or vice versa, there is a requirement for a time lag between the two events. This challenge or limitation is due to the inherent nature of the most commonly used input data, which is aggregated over a period of time. For such aggregated data, when using existing methods and tools, though the high correlation between two variables might be established, the identification of cause-effect directional relationship is not possible.

FIG. 1 illustrates the limitation of time aggregated data. In particular, graph 101 illustrates how real-time granular data establishes not only the strong relationship between X and Y, but it can also be seen that the drop in X occurs before the drop in Y, and that therefore X would be the cause and Y would be the effect. However, graph 102 illustrates how time-aggregated data can only establish the relationship between the variables, and there is not enough information to infer which variable would be the cause and which variable would be the effect. Unfortunately, real-time granular data as illustrated in graph 101 is often expensive and therefore impractical.

In some prior solutions, causal map creation is dependent on critical domain knowledge in the form of, for example, an ontology or known cause-effect directional relationships between pairs of variables. However, with the introduction of new technologies, architecture and due to the co-existence of multiple technologies, complexity in interworking, and complex product functionality, the available domain knowledge becomes insufficient to define all the relationships with acceptable accuracy.

Many existing rule-based and ML-based methods can determine or infer the problem quite efficiently by analyzing the pattern of the features. However, knowing the problem does not necessarily lead to the most appropriate solution.

There may be multiple solutions or remedies to a network problem. Deciding the most appropriate and efficient remedy is one of the key challenges, and this remains unattended by the existing methods. Given a representation of the problem i.e. an inference or a decision, existing methods can't explain why such inference has been made or what is the underlying reason behind such a decision. However, this explanation may be key to determining the most appropriate and efficient solution.

Figure 2A:
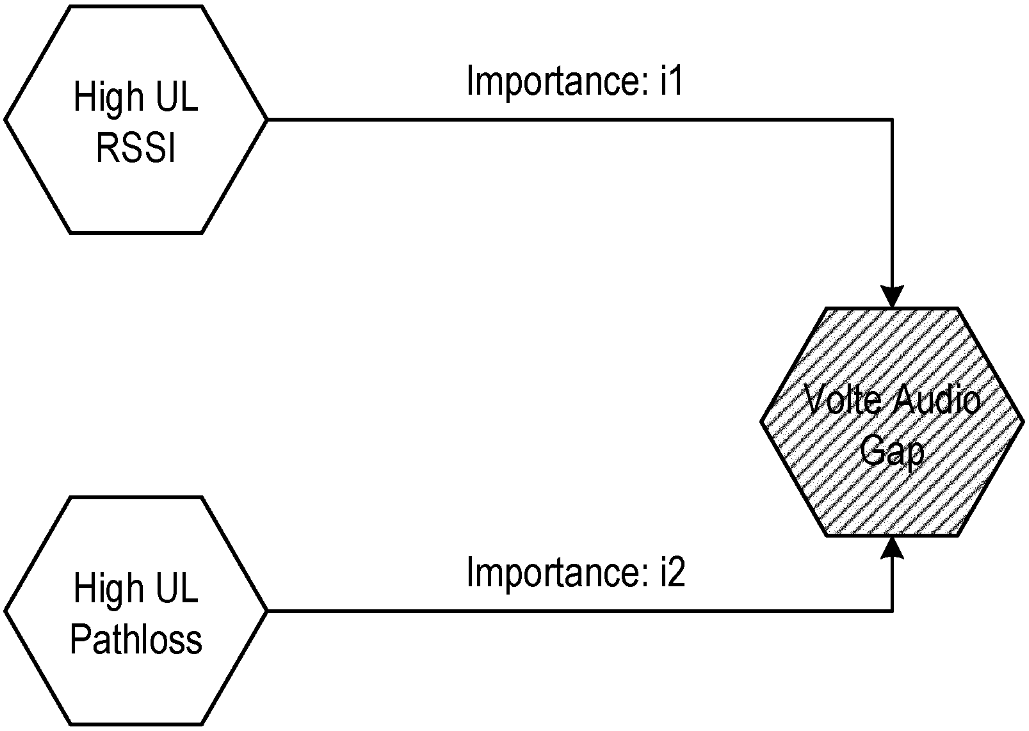
FIG. 2*a* illustrates an example causal map showing no explanation of the relationship between the root cause feature and the event feature.
Figure 2B:
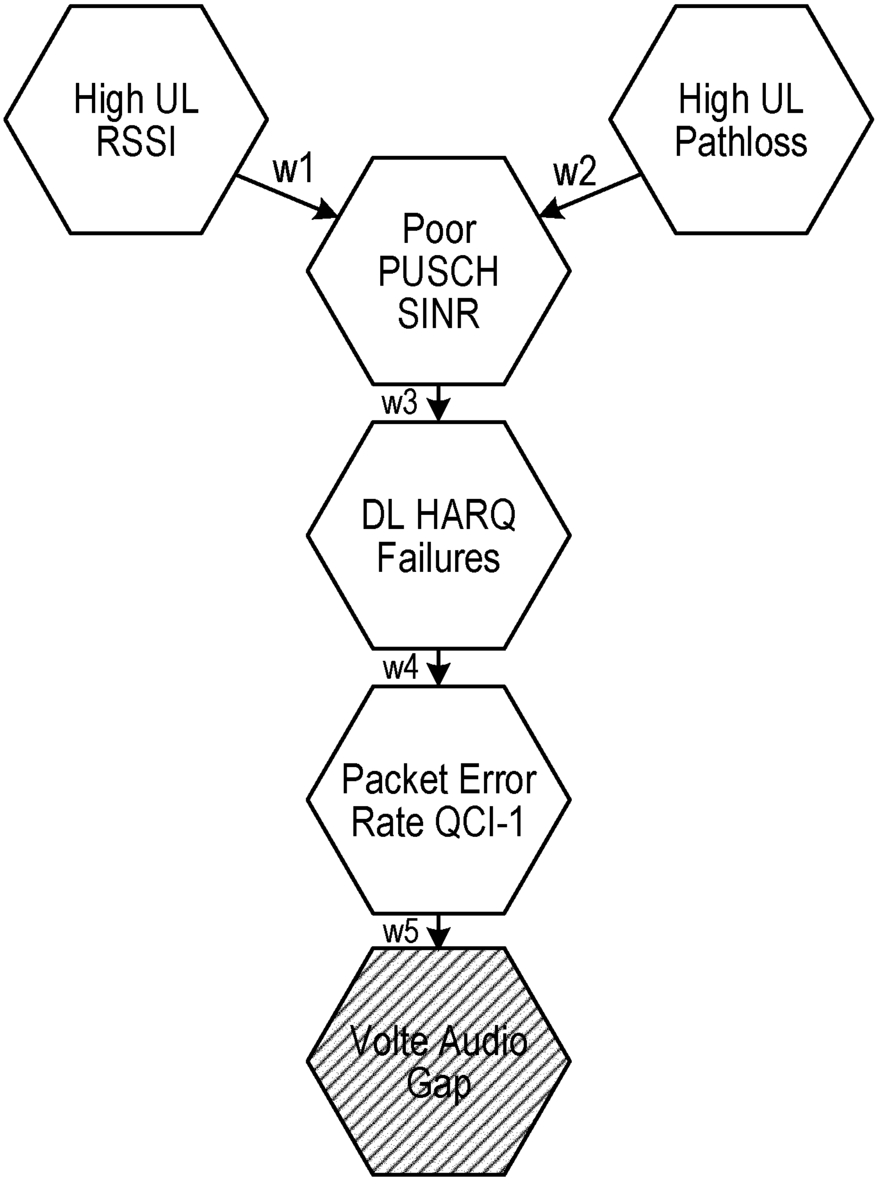
FIG. 2*b* illustrates an example causal map showing an explanation of the relationship between the root cause feature and the event feature.

FIG. 2*a* illustrates an example causal map showing no explanation of the relationship between the root cause feature and the event feature. FIG. 2*b* illustrates an example causal map showing an explanation of the relationship between the root cause feature and the event feature.

For example, during an investigation of an event such as high VOLTE Audio Gap (Muting of VOLTE calls), the existing methods may yield the result illustrated in FIG. 2*a* which determines the dominant root causes (e.g. High UL RSSI and High UL Pathloss), without representing their inter-dependency.

However, embodiments described herein are able to explain the result by illustrating intermediate features between the dominant root causes and the event, for example as illustrated in FIG. 2*b*. This determination and illustration of the intermediate features helps provide an understanding of how the system is behaving i.e. High UL RSSI and High UL Path Loss both are causing poor PUSCH SINR which again results in DL HARQ process failures. Due to HARQ failures, packets associated with QCI-1 i.e. voice bearer are received with error finally resulting in High VOLTE Audio Gap.

This more detailed explanation of the cause of the event leads to the discovery of further possible solutions to the problem of the event.

For example, for the explanation provided by the causal map of FIG. 2*b* may indicate that the following solutions are available:

Improving UL Coverage

Providing corrective measures for high UL RSSI

Improving UL SINR using radio network features

Tuning HARQ parameters and features

Whereas, when presented with the causal map of FIG. 2*a*, only the first two solutions (providing UL coverage and providing corrective measures for high UL RSSI) may be discernable.

Some of the above solutions are costly and some are cost-effective. However, by providing further explanation, there are more options to choose from which improves flexibility and allows for different decisions to be made depending on business need.

Embodiments described herein provide a method and apparatus for determining a first causal map for the root cause analysis of a primary event in a network environment. In particular, the method may be considered to comprise two broad steps. Firstly, a plurality of features representative of the network environment may be arranged according to a proposed architecture. In a second step, the organization of the plurality of features may be exploited in order to apply an iterative method for the evaluation of the strength of each combination of features i.e. the relationships, in adjacent groups in the architecture. When applied sequentially, at the end of the second step a causal network is generated. The structure of the causal network combined with the strength and direction of each relation or edge within this network helps in resolving the problem, which is being addressed by answering various queries associated with the dataset and the problem. Along with this, the proposed solution explains the behavior of various features within the dataset and finally leads to one or many plausible solutions to a given problem that can be observed using the dataset.

Figure 3:
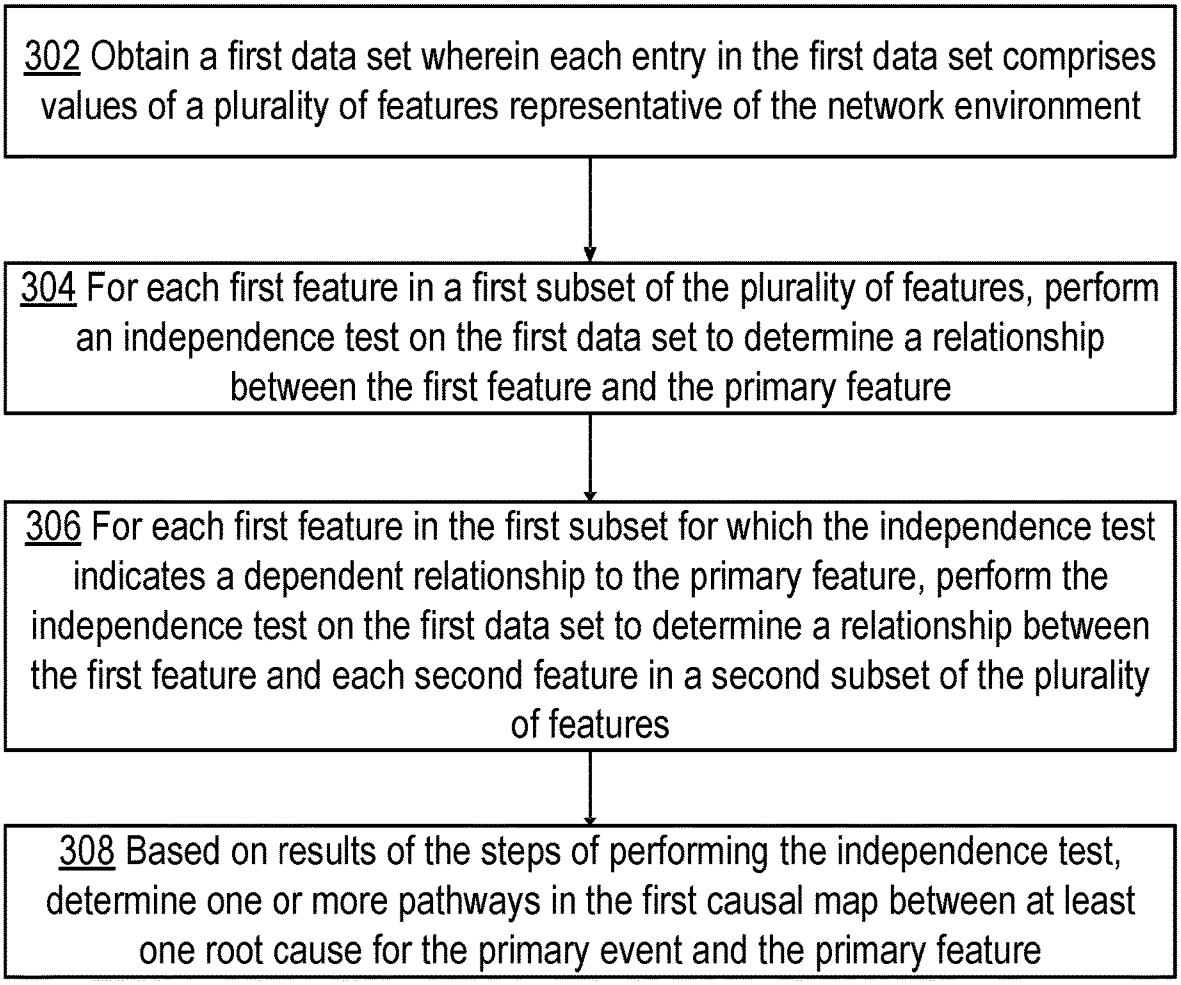
FIG. 3 illustrates a method implemented in an apparatus, of determining a first causal map for the root cause analysis of a primary event in a network environment in accordance with an embodiment.

FIG. 3 illustrates a method 300 implemented in an apparatus, of determining a first causal map for the root cause analysis of a primary event in a network environment. A primary event is an event for which the root cause analysis is to be performed. For example, a primary event may comprise an event which could be considered undesirable or faulty in the given network environment.

In some examples, apparatus may comprise a network node, which may comprise a physical or virtual node, and may be implemented in a computing device or server apparatus and/or in a virtualized environment, for example in a cloud, edge cloud or fog deployment.

In some examples the apparatus may comprise a device that may or may not be connected to a network. For example, the device may comprise an operations engine. The operations engine may be configured to perform the method in an offline manner, for example, in order to troubleshoot problems on site.

In step 302 the apparatus obtains a first data set wherein each entry in the first data set comprises values of a plurality of features representative of the network environment. The plurality of features comprises a primary feature representative of the primary event. The term primary feature is utilized to distinguish the feature representative of the primary event that the analysis is being performed for, from other features in the plurality of features. It will be appreciated that in some examples more than one primary feature may represent a primary event. For example, for Accessibility, the primary features may be Radio Resource Control (RRC) setup success rate, S1 Initial context setup success rate, E-UTRAN Radio Access Bearer (ERAB) establishment success rate etc.

For example, if the primary event comprises a high VOLTE Audio Gap the primary feature may comprise the performance indicator AUDIO_GAP_MS which indicates the duration of VOLTE call muting in milliseconds.

In step 304 the apparatus, for each first feature in a first subset of the plurality of features, performs an independence test on the first data set to determine a relationship between the first feature and the primary feature.

In step 306 the apparatus, for each first feature in the first subset for which the independence test indicates a dependent relationship to the primary feature, performs the independence test on the first data set to determine a relationship between the first feature and each second feature in a second subset of the plurality of features.

The first subset and the second subset of the plurality of features may be determined based on a hierarchy architecture in which the plurality of features have been arranged. An example of how this hierarchy may be determined is described in more detail with reference to FIGS. 5 and 6.

It will be appreciated that there may be any number of subsets of the plurality of features. Step 306 may therefore be performed iteratively to consecutive pairs of subsets, working up the hierarchy to a root cause group of features that comprises features that are suspected root causes of the primary event.

In some examples, the apparatus, responsive to the steps of performing the independence test indicating that two features in the plurality of features have a dependent relationship, indicates a dependent relationship between the two features as an edge in the first causal map. An edge between two features may indicate that the two features have a directional relationship (in other words, one feature leads to the occurrence of the other).

In step 308 the apparatus, based on results of the steps of performing the independence test, determines one or more pathways in the first causal map between at least one root cause for the primary event and the primary feature.

For example, each pathway may be formed from one or more edges in the first causal map.

It will be appreciated that, as at least two steps of performing the independence test are performed (e.g. on the primary feature and the first subset, and the first subset and the second subset), pathways may be found that comprise at least one intermediate feature between the primary feature and a suspected root cause for the primary event.

As illustrated in FIGS. 2*a* and 2*b*, the provision of such an intermediate feature may help to provide alternative solutions or corrective actions that may be performed in response to occurrence of the primary event, for example, in a troubleshooting scenario.

In some examples therefore, responsive to occurrence of the primary event, the apparatus may determine one or more actions to perform in the network environment to resolve the occurrence of the primary event based on the first causal map. In some examples, the one or more actions may be determined based at least in part on the at least one intermediate feature in the one or more pathways. For example, if the method of FIG. 3 output the causal map illustrated in FIG. 2*b* as the first causal map, the apparatus may determine the actions of "improving UL SINR using radio network features" and/or "tuning HARQ parameters and features" based on the intermediate features of "poor PUSCH SINR" and "DL HARQ process failures" respectively.

The plurality of features may comprise one or more of: key performance indicators; configuration data; alarm information and fault management data. The network environment may comprise any suitable network environment, for example one of: a radio access network, a core network, an Internet Protocol network, and a cloud network.

It will be appreciated that the plurality of features may comprise features relating to a specific network node(s) within the network environment. For example the plurality of features may comprise various physical attributes of the network node(s) like Latitude, Longitude, Height, Tilt, Antenna Azimuth, Layer type, Deployment type, etc. These features may be referred to as network topology data.

The plurality of features may additionally or alternatively comprise configuration management. Configuration management data may comprise current network configurational settings in tandem with which the system works.

The plurality of features may additionally or alternatively comprise performance management data such as features relating to aspects required for proper network functioning and performance measurements, for example, based on various Key performance indicators derived from various sets of inputs like Counters, Drive Test, Traces, etc.

The plurality of features may additionally or alternatively comprise alarms raised in the network environment. The alarms may be defined by a vendor for a specific product version on the occurrence of any abnormal event such as a cell being down due to outage The plurality of features may additionally comprise features relating to device types in the network environment. For example, the features may relate to the class and type of UEs in a network just in case any handset-specific issue is encountered.

Figure 4:
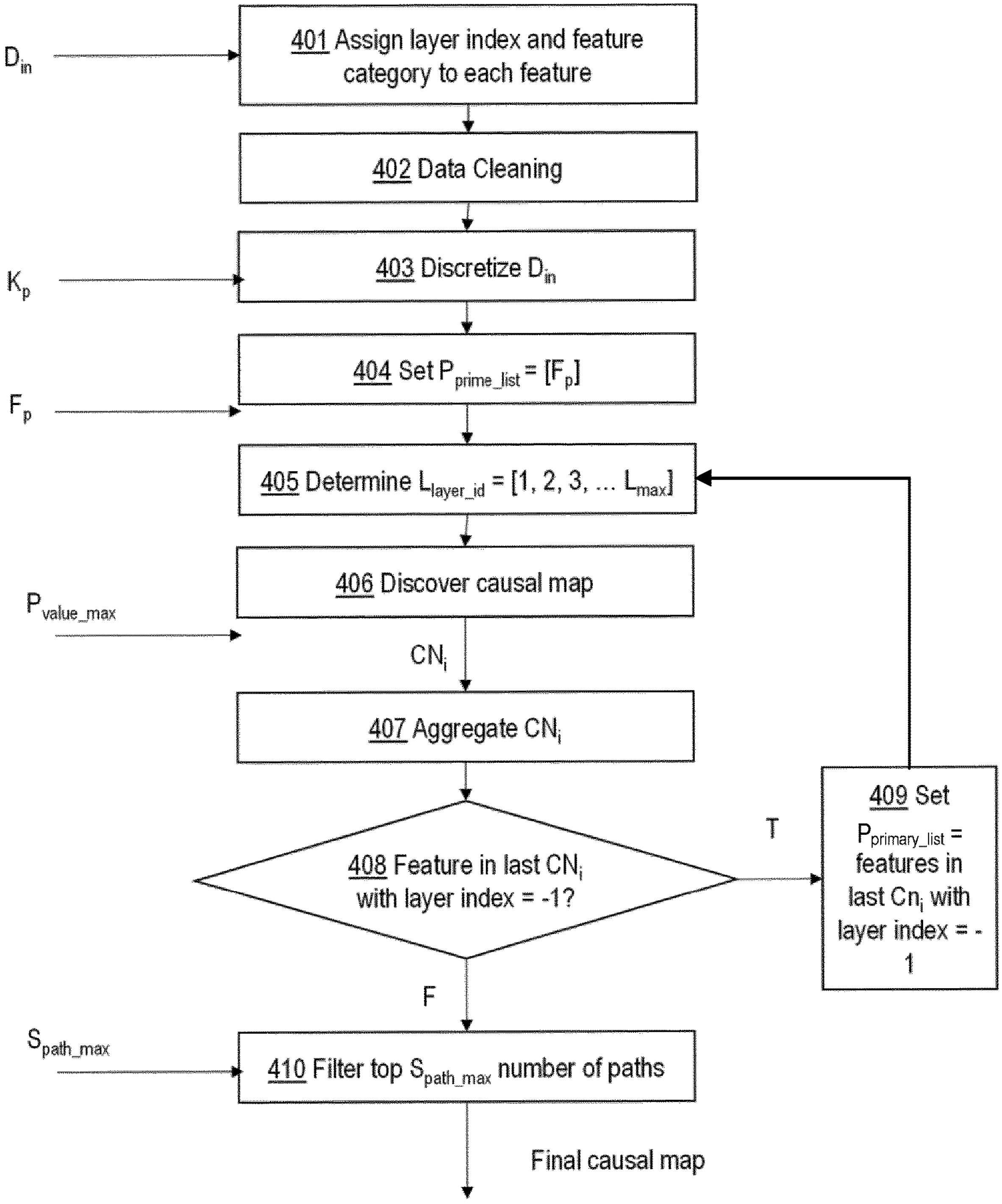
FIG. 4 illustrates an example implementation of the method of FIG. 3 in accordance with an embodiment.

FIG. 4 illustrates an example implementation of the method of FIG. 3.

The method of FIG. 4 receives as an input the input data set $D_{in}$. $D_{in}$ may comprise the plurality of features including the primary feature. $D_{in}$ may comprise a tabular or rectangular dataset with (n+1) columns. The end goal of the overall method is to derive a first causal network that may help to explain the underlying reason for the poor performance of the primary feature, $F_p$, $i=\{0, 1, 2, \ldots, n\}$, $p \in i$.

In step 401 the method comprises grouping the plurality of features into a plurality of non-overlapping groups, wherein at least two or more of the plurality of non-overlapping groups are arranged into a hierarchy, wherein the hierarchy starts with a primary group comprising the primary feature and ends with a root cause group comprising one or more suspected root causes for the primary feature. For example, the first subset of the plurality of features may be associated with a first group, and the second subset of the plurality of features may be associated with a second group.

Step 401 may for example comprise grouping the plurality of features by assigning a layer index to each of the plurality of features. Features having the same layer index may then be considered as being part of the same group.

In some examples, the grouping of the plurality of features may be based at least in part on which layer in a protocol stack is associated with each feature.

Figure 5:
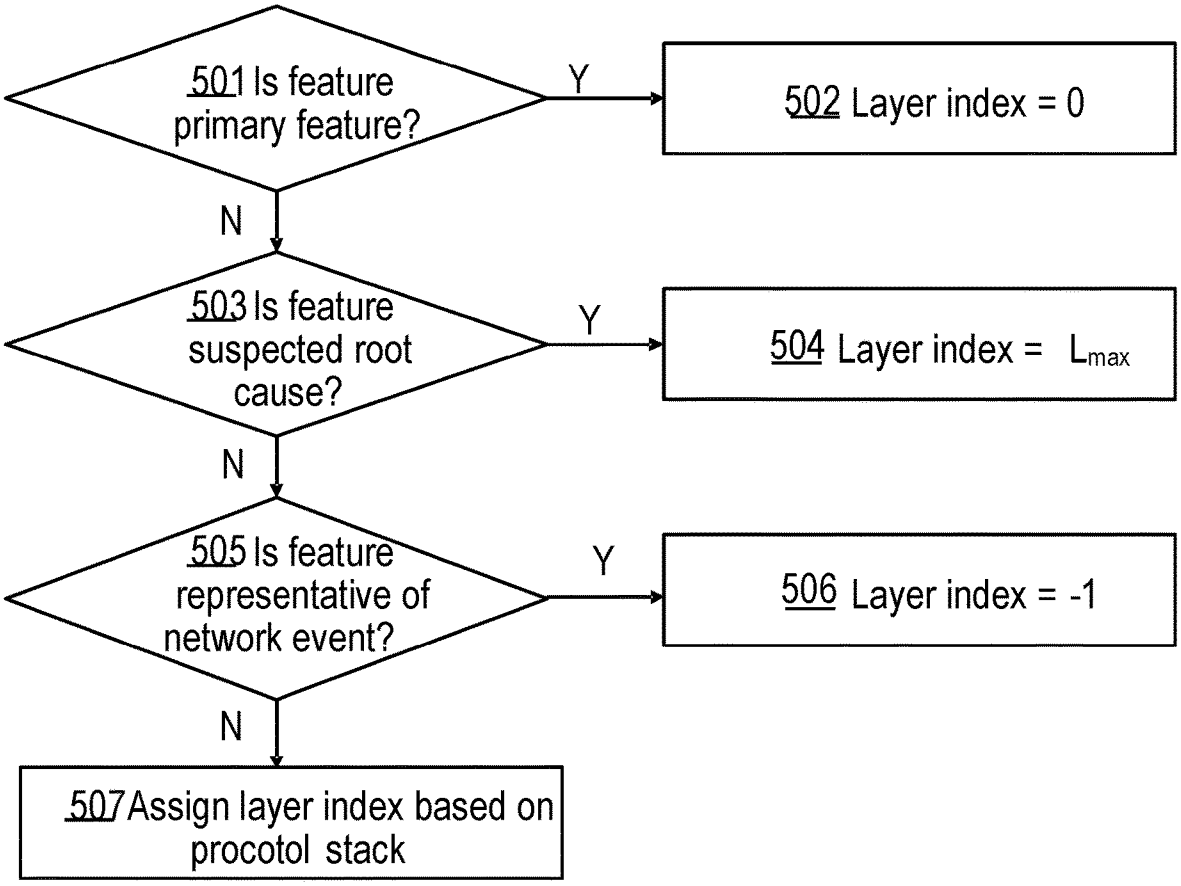
FIG. 5 illustrates an example implementation of step 401 of FIG. 4 in which a layer index is assigned to each of the plurality of features in accordance with an embodiment.

FIG. 5 illustrates an example implementation of step 401 of FIG. 4 in which a layer index is assigned to each of the plurality of features. The method of FIG. 5 may be performed for each feature in the plurality of features.

In step 501 the method comprises determining whether the feature represents the primary event. If the feature represents the primary event (e.g. comprises the primary feature), the feature is assigned a layer index of 0 in step 502.

If the feature does not represent the primary event, the method passes to step 503. In step 503 the method comprises determining if the feature is suspected as a probable root cause for the primary event. If the feature is suspected as being a probable root cause for the primary event, the method comprises assigning a maximum layer index, $L_{max}$, to the feature in step 504. Which features are suspected as (or to be tested as) a probable root cause for the primary event may be determined based on domain knowledge.

If the feature is not suspected as a probable root cause for the primary event the method passes to step 505. In step 505 the method comprises determining if the feature is representative of a network performance event. For example, it will be appreciated that many types of network performance events may occur in the network (e.g. RRC Reestablishment attempt for QCI 1, Intra Frequency Handover Execution Attempts for Quality of Service Class Identifier 1 (QCI 1)). A feature (e.g. RRC_REESTABLISHMENT_ATT_QCI1_PER_ERAB, or INTRA_EXE_ATT_COUNT_QCI1_PER_ERAB) may therefore be considered as a feature representative of a network event.

If the feature is representative of a network performance event the feature is assigned to an event group of features. Features in the event group may be assigned a layer index of −1 in step 506. It will be appreciated that any other label may be assigned to features in the event group of features, as long as the label distinguishes the event group from other groups of features.

If the feature is not representative of a network performance event the method passes to step 507. In step 507, the method comprises assigning a layer index between 1 and one less than a maximum layer index to the feature based on which layer in a protocol stack is associated with the feature. In other words, for all features that are not one of: the primary feature, a suspected root cause feature, or feature representative of a network performance event, the method comprises assigning a layer index between 1 and one less than a maximum layer index to the feature based on which layer in a protocol stack is associated with the feature.

It will be appreciated that most network data commonly used in network performance analysis can be associated with a network protocol layer based on standardisation or very commonly available product information. Two types of data that may or may not be generated from the network and may not be easily associated with a protocol layer could be external features such as a type of area (e.g. Rural, Urban, Dense Urban, a building density etc.), or a feature that represents a network performance event (e.g. a number of re-establishment attempts, a number of handover execution failures, etc.). These types of features may have considerable influence on the primary feature, $f_p$. However, as previously mentioned the features that represent network performance events have already been assigned to an event group. External features such as a type of area may be assigned the highest layer index $L_{max}$.

For the other features gleaned from the network that have not yet been assigned to a group (for example, assigned a layer index), it will be possible to determine a protocol layer associated with the feature.

Figure 6:
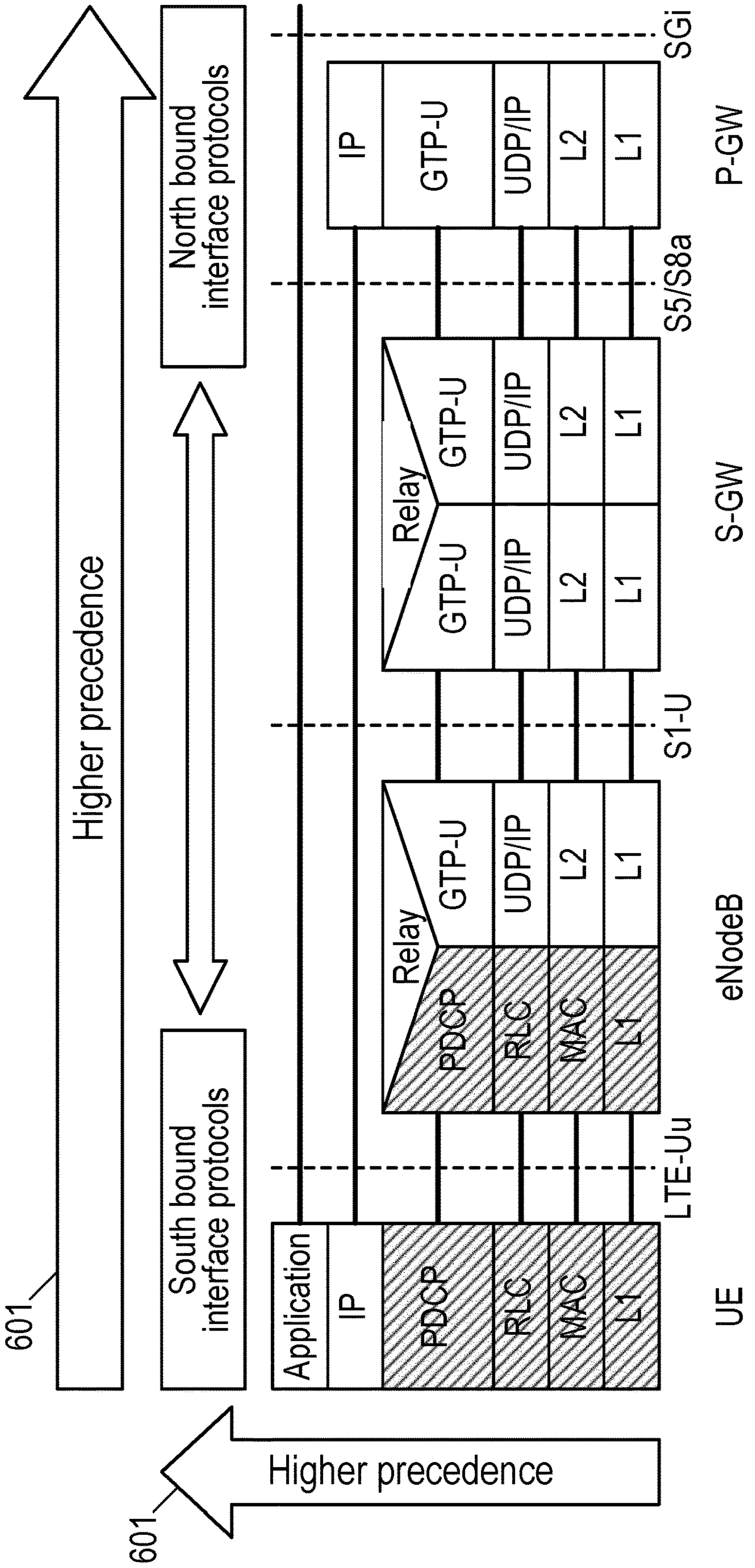
FIG. 6 illustrates an example protocol stack.

FIG. 6 illustrates an example protocol stack 600. The protocol stack 600 is an example of an LTE protocol stack. It will however be appreciated that many types of protocol stack exist, e.g. a TCP/IP protocol stack, a 5G protocol stack etc. The principles described herein may be applied to any suitable type of protocol stack.

In this example protocol stack, the arrows 601 and 602 indicate how some layers may be given higher precedence over other layers in the stack. For example, as indicated by arrow 601, northbound domains or nodes in a protocol stack may take higher precedence over southbound domains or nodes in the protocol stack. As indicated by arrow 602, within a domain or node, the higher layer protocols may have higher precedence over the lower layer protocols.

The protocol layers in a stack may then be arranged according to their precedence.

Figure 7:
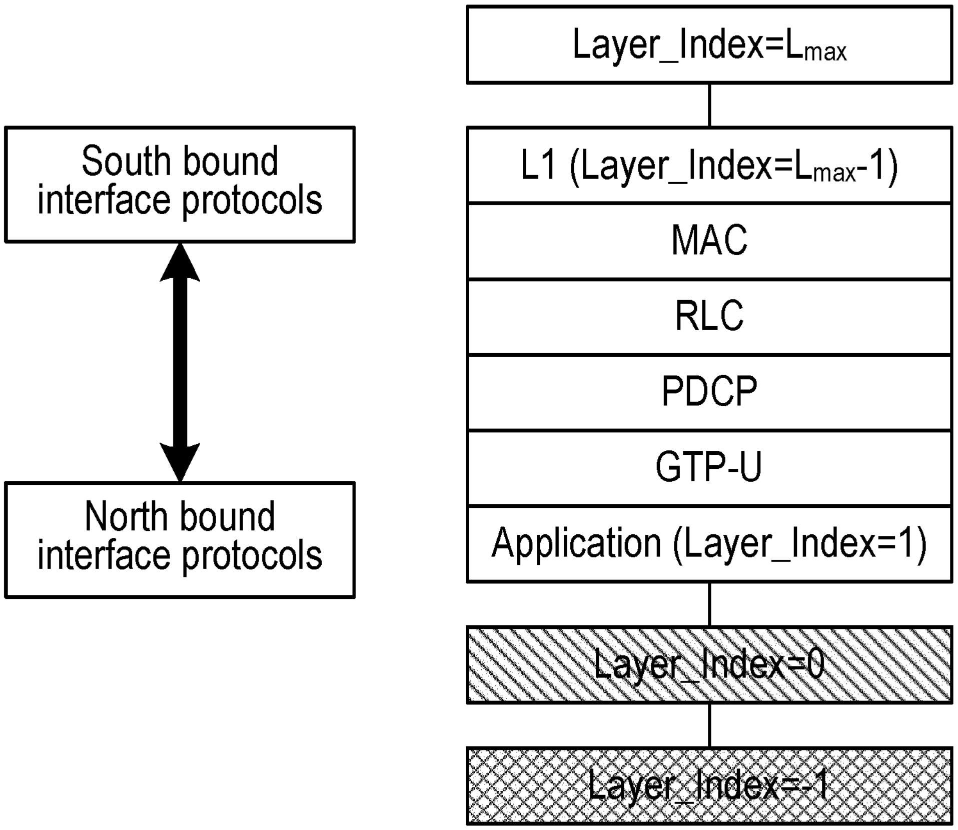
FIG. 7 illustrates an example of how the protocol layers in a stack may be arranged according to their precedence in accordance with an embodiment.

FIG. 7 illustrates an example of how the protocol layers in a stack may be arranged according to their precedence.

In this example, $L_{max}$ is the total number of groups over which the plurality of features are distributed. The value of $L_{max}$ depends on the number of unique protocol layers that are associated with any of the plurality of features (e.g. not including protocol layers that do not happen to be associated with any of the plurality of features).

As described above with reference to FIG. 5, a layer index of $L_{max}$ is assigned to the group comprising suspected root causes for the primary event. A layer index of 0 is assigned to the primary feature, and a layer index of −1 is assigned to features representative of an event group.

The other features as assigned a layer index between 0 and ($L_{max}$−1) depending on the protocol layer they are associated with.

The features assigned a layer index between 0 and $L_{max}$ all fall within a hierarchy of features. Those with a layer index of −1 sit outside the hierarchy, as will be described in more detail with reference to FIG. 8.

The protocol layers may be associated with increasing values of layer index with decreasing precedence. In other words, those with higher precedence are positioned closer in the hierarchy to the primary feature.

In the example illustrated the protocol layers "Application" "GTP-U", "PDCP", "RLC", "MAC", and "L1" are each associated with one or more of the following features. In this example therefore $L_{max}$=7. In this example, the layer indexes are assigned as follows: "Application"=1, ""GTP-U"=2, "PDCP"=3, "RLC"=4, "MAC"=5, and "L1"=6.

Figure 8:
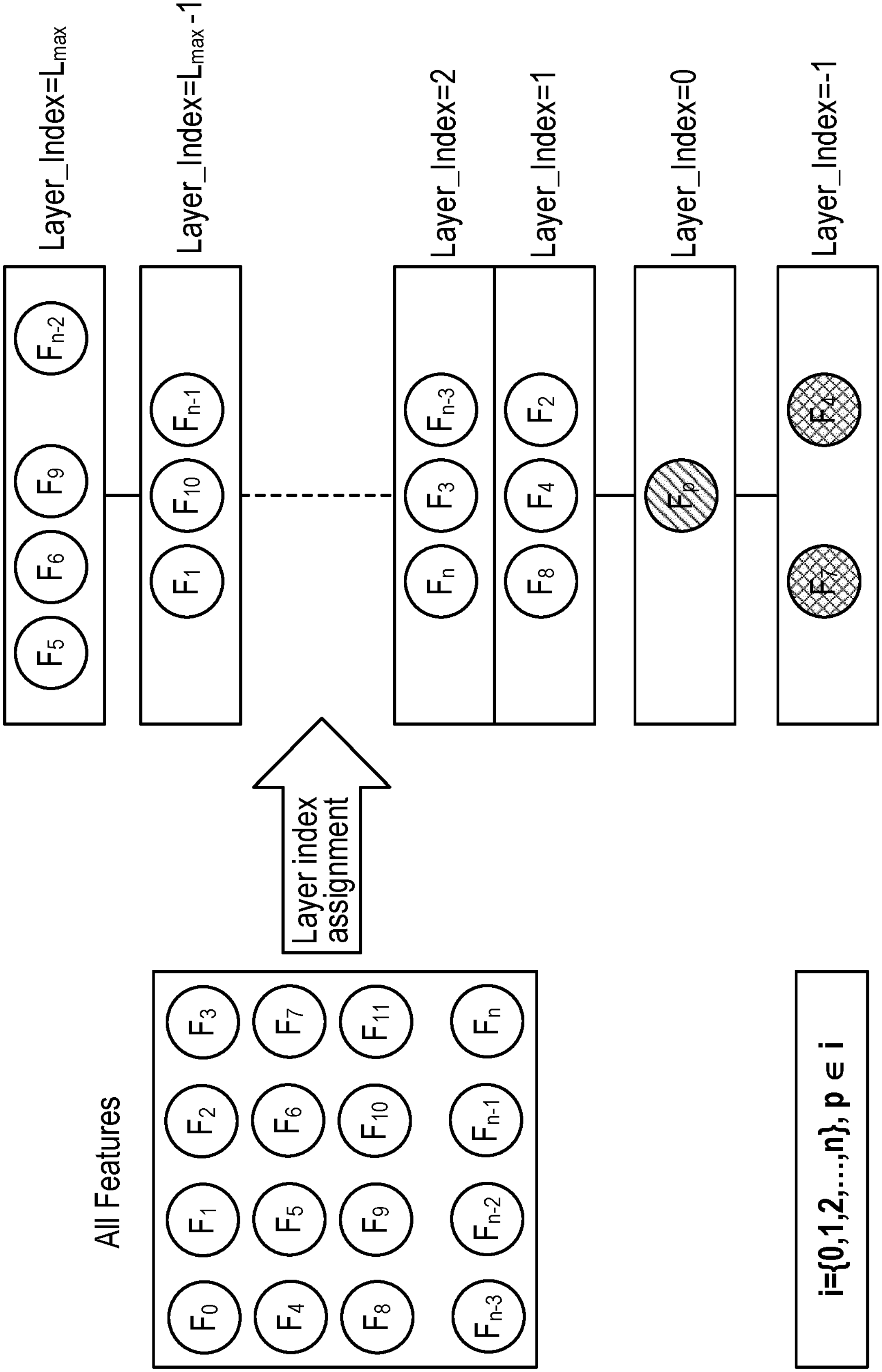
FIG. 8 illustrates an example of the allocation of features $F_1$ to $F_n$ to different groups in accordance with an embodiment.

FIG. 8 illustrates an example of the allocation of features $F_1$ to $F_n$ to different groups. The event group comprises the features $F_7$ and $F_4$ and is assigned the layer index−1. It will be appreciated that, in this example, the features $F_7$ and $F_4$ are therefore representative of network performance events.

The hierarchy of groups comprises the groups associated with the layer indexes from 0 to $L_{nmax}$. The primary group comprises the primary feature, $F_p$, and is assigned the layer index 0.

A first group comprises the features $F_8$, $F_4$, and $F_2$ and is assigned the layer index 1. A second group comprises the features $F_n$, $F_3$, and $F_{n-3}$ and is assigned the layer index 2. A $(L_{max}-1)^{th}$ group comprises the features $F_1$, $F_{10}$, and $F_{n-1}$ and is assigned the layer index $L_{max}$−1. An $L_{max}{}^{th}$ group comprises the features $F_5$, $F_6$, $F_9$, and $F_{n-2}$.

Step 401 of FIG. 4 may further comprise categorizing each of the plurality of features as a positive or negative oriented feature based on whether each feature would be considered better if observed with a higher value or a lower value. For example, positive oriented features may be those which are considered to be better if observed with higher values. Negative oriented features would therefore be the opposite in nature, so would be considered to be better if observed with lower values. In some examples, positive and negative oriented features may be labelled as having a category of 1 and 0 respectively. It will be appreciated that other techniques may be used to distinguish between positive and negative oriented features.

Step 401 of FIG. 4 may therefore generate an overall mapping, $L_{map}$, of the features to their respective layer indexes and categories. A partial example of such a mapping is illustrated in table 1 below.

TABLE 1

Partial example of an $L_{map}$

| Feature Name | Category | Layer Index |
|---|---|---|
| AUDIO_GAP_MS | 0 | 0 |
| AVERAGE_CQI_DB | 1 | 4 |
| AVERAGE_DL_SE_TTI# | 0 | 4 |
| AVERAGE_PUCCH_SINR_DB | 1 | 4 |
| AVERAGE_PUSCH_SINR_DB | 1 | 4 |
| AVERAGE_RSRP_DBM | 1 | 4 |
| AVERAGE_RSRQ_DB | 1 | 4 |
| AVERAGE_TA | 0 | 5 |
| AVERAGE_UL_SE_TTI_# | 0 | 4 |
| AVG_ACTIVE_USERS_DL_# | 0 | 5 |
| [. . .] | [. . .] | [. . .] |

It will be appreciated that the first subset of the plurality of features may be associated with a layer index of 1 (e.g. the group above the primary group in the hierarchy) and the second subset of the plurality of features may be associated with a layer index of 2 (e.g. the group above the first subset in the hierarchy).

In step 402 of FIG. 2 the method comprises cleaning the data set $D_{in}$. For example, anomalous values of a feature may be replaced with, for example, the median value of the same feature.

It will be appreciated that different strategies may be used to perform data cleaning. However, the strategy employed may for example depend on the type of information represented by the feature. The goal of this step is to prepare the dataset such that it can be accepted by the functions used in subsequent methods. The person skilled in the art will appreciate many possible known methods for performing such data cleaning.

In step 403 the method comprises discretizing the values of each of the plurality of features in to $K_p$ number of bins using K-Means algorithm.

Figure 9:
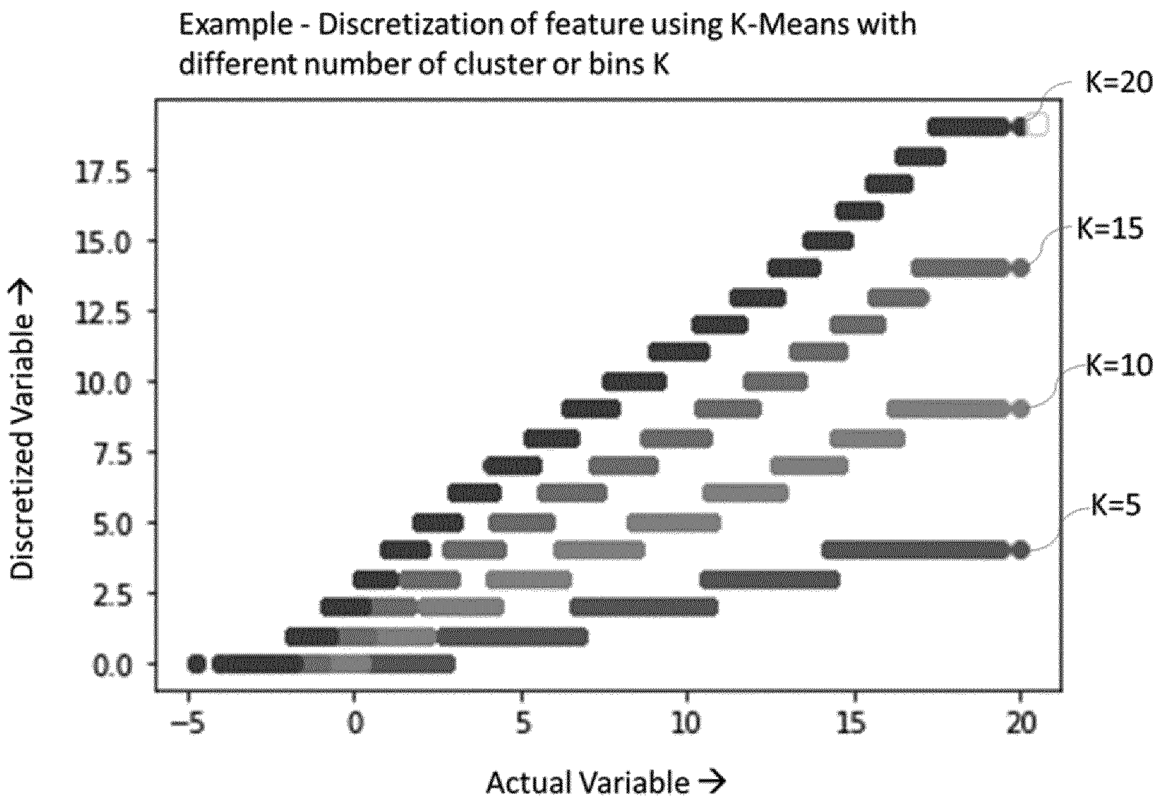
FIG. 9 illustrates an example of the discretization of a feature using a different number of clusters or bins in accordance with an embodiment.

FIG. 9 illustrates an example of the discretization of a feature using a different number of clusters or bins.

Step 403 results in a transformed dataset, $D_{trans}$, containing the discretized features. $D_{trans}$ may be considered as tabular data with (n+1) columns containing the plurality of features.

In step 404 the method comprises setting a first list "$P_{prime\_list}$" to contain the primary feature. In other words, $P_{prime\_list}=[F_p]$.

$P_{prime\_list}$ may be described as a list comprising all features that represent the primary event. This list may be updated in subsequent steps.

It will be appreciated that in some embodiments the steps of the method may be performed without explicitly defining $P_{prime\_list}$. However, defining this list is one possible way to implement some of the following steps of the method of FIG. 4.

In step 405, the method may comprise determining a sorted list of unique layer indices, $L_{layer\_id}$. $L_{layer\_id}$ may be generated from $L_{map}$. All the features with a layer index of −1 i.e. all the features which represent a network performance event are excluded from this list.

The length of the list $L_{layer\_id}$ is therefore $L_{max}$.

In step 406 the method comprises discovering the first causal map. In some examples, this step may utilise a chi-squared test for independence to iteratively determine relationships between features in the adjacent layers in the hierarchy of layer (i.e. those with a layer index of 0 to $L_{max}$). In some examples an F-test or G-test will be used instead of the chi-squared test. It will be appreciated that many types of statistical tests for independence of variable exist, and that any suitable test may be utilised in embodiments described herein.

Step 406 may receive the following as an input: the list $P_{prime\_list}$ the sorted list of unique layer indices $L_{layer\_id}$, the transformed data set $D_{trans}$ and the mapping $L_{map}$.

Figure 10:
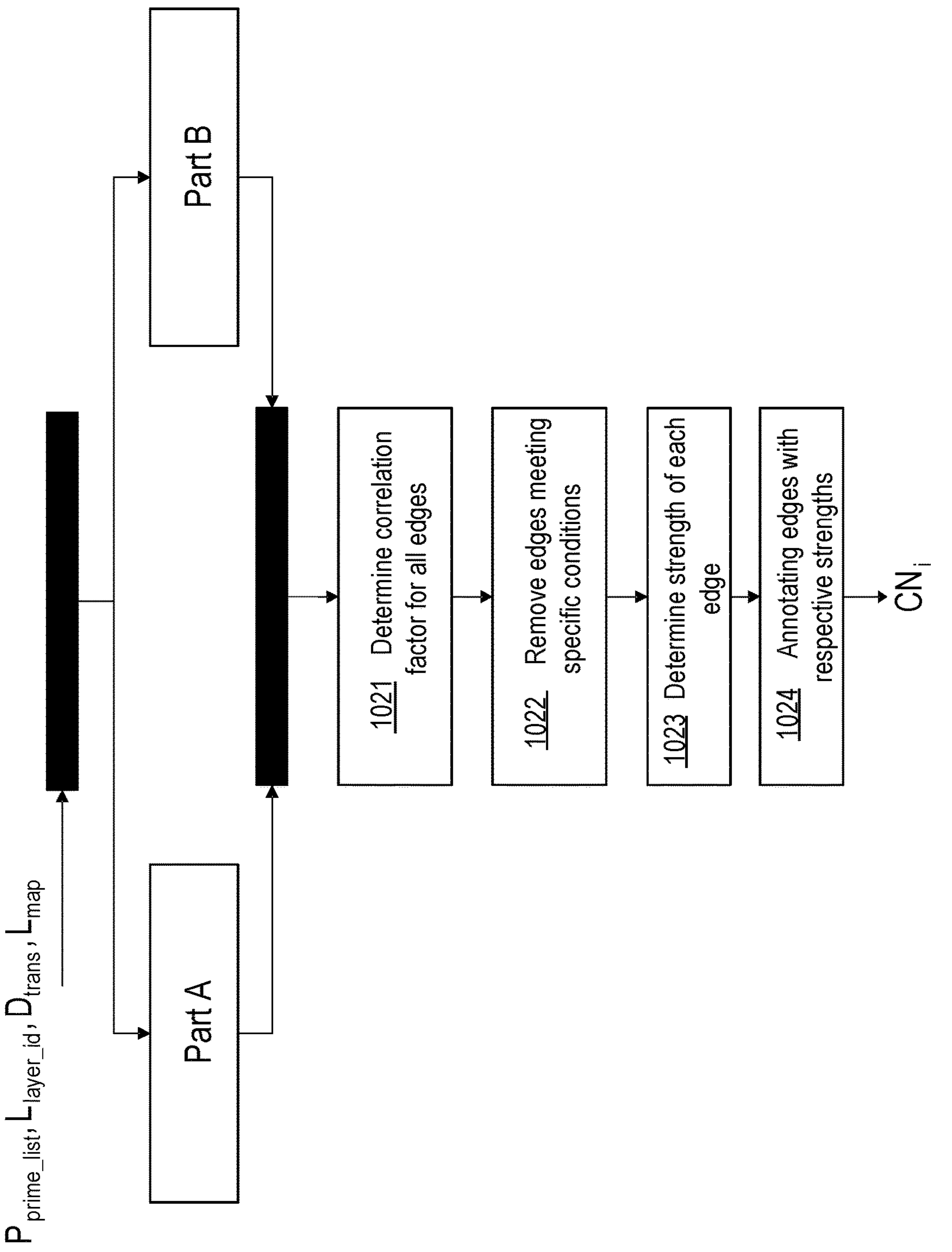
FIG. 10 illustrates an example implementation of step 406 of FIG. 4 in accordance with an embodiment.
Figure 10:
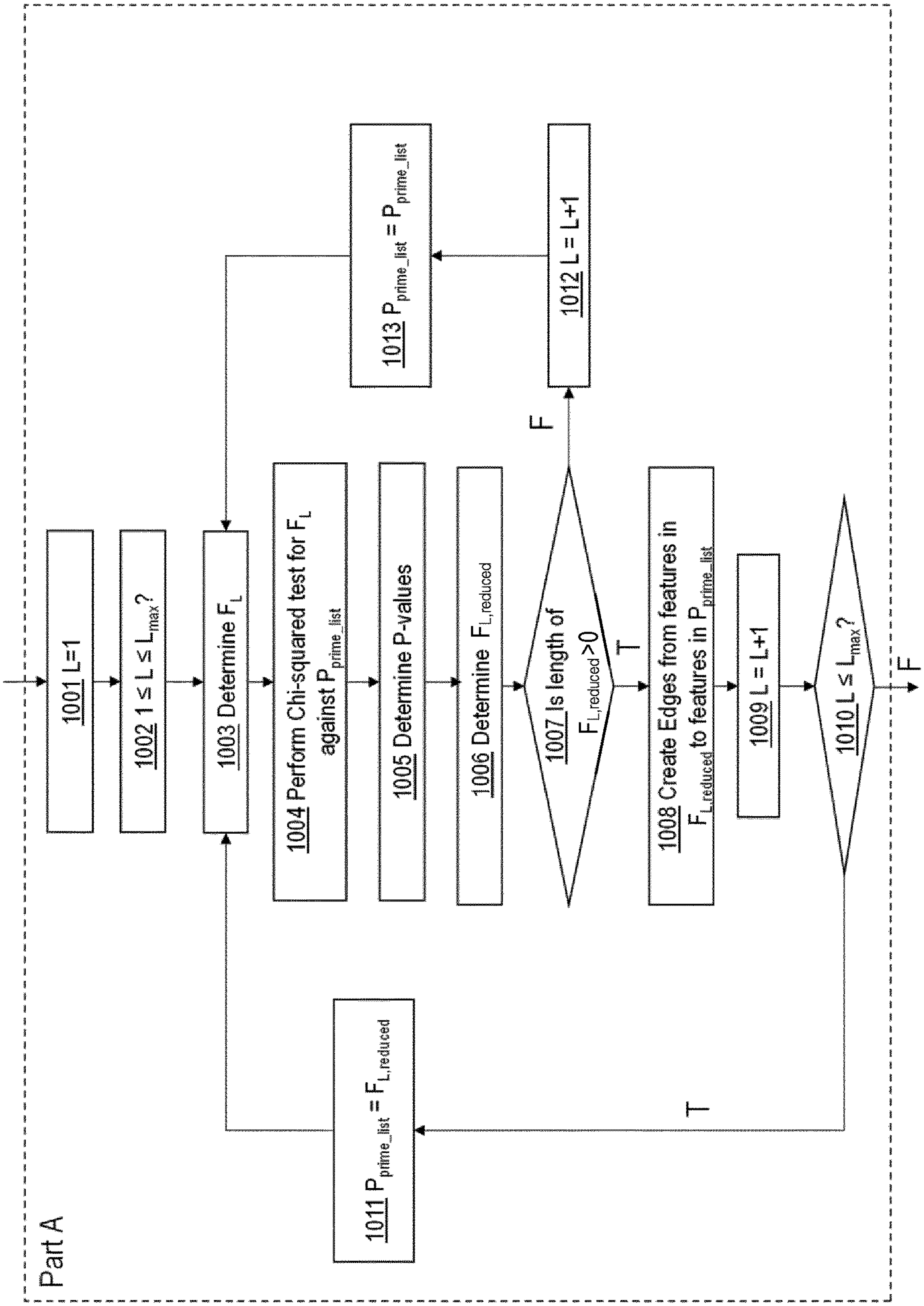
Figure 10:
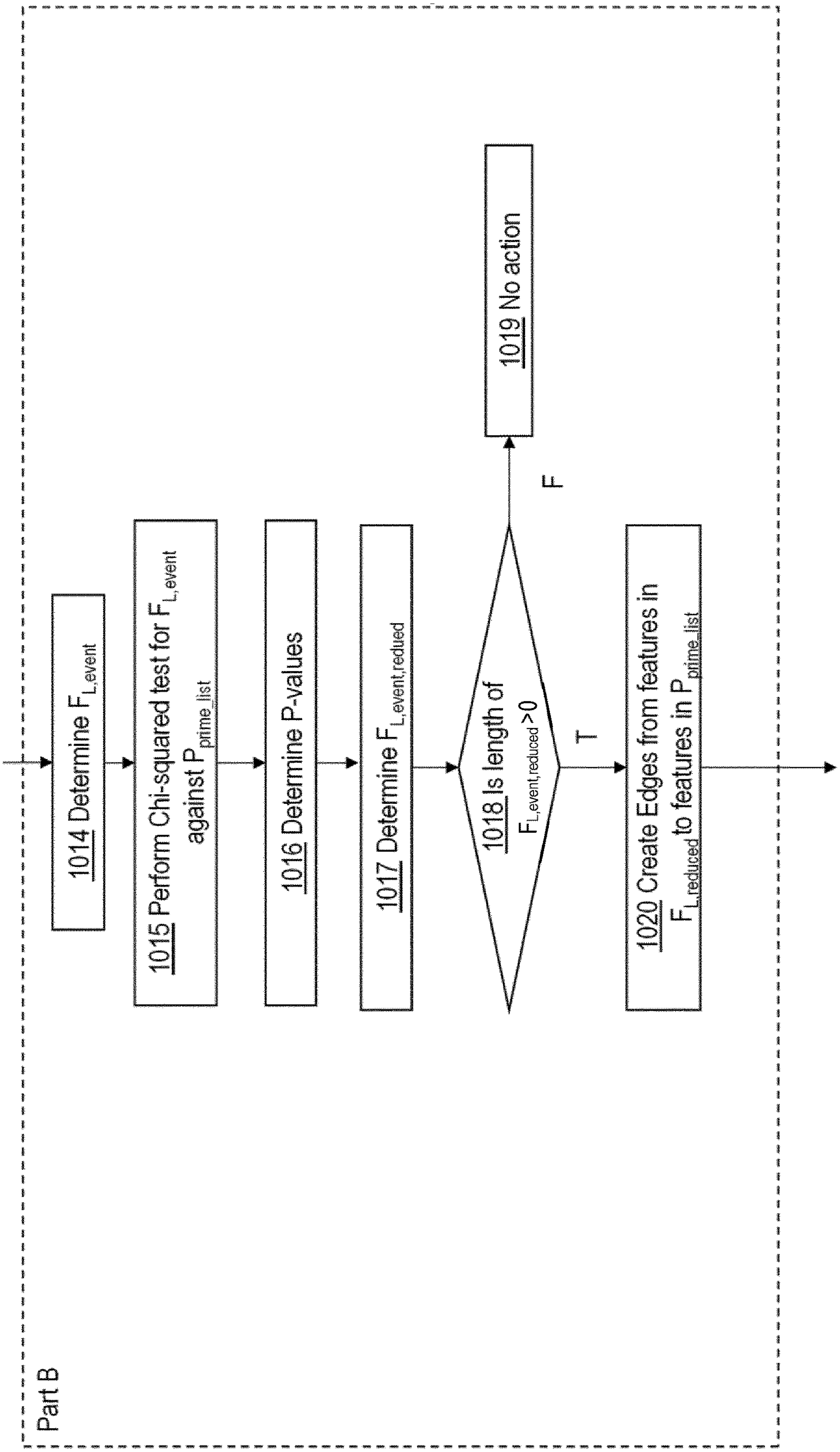

FIG. 10 illustrates an example implementation of step 406 of FIG. 4.

The method of FIG. 10 can be split into two parts. Part A is an iterative process over each L (where L is a parameter increased from 1 to $L_{max}$ with each iteration) and $P_{prime\_list}$ (where $P_{prime\_list}$ may be updated at each iteration). In each iteration, the significantly strong relationships are identified among all the relationships between the features with layer index=L and the features with layer index=(L−1) that have been shown to have strong relationships to the layer below. This process is continued till $L=L_{max}$ is reached. Part A comprises steps 1001 to 1013.

Part B is to determine all the features in the event group, with Layer_Index=−1, that have a significantly strong relationship to features in the primary group. Part B comprises steps 1014 to 1020.

In step 1001 the method comprises setting the initial value of a parameter L to 1.

In step 1002 the method comprises checking that the current value of the parameter L is between 1 and $L_{max}$ (inclusive).

In step 1003 the method comprises determining the features (e.g. a list $F_L$) having the layer index=L (which initially is 1). Using the example of group allocation illustrated in FIG. 6, the list of features $F_L$ would comprise the features $F_8$, $F_4$, and $F_2$.

In other words, in each iteration, for a given layer with Layer Index=L and $P_{prime\_list}$, a list $F_L$ is derived using $L_{map}$, where $F_L$ contains all the features with Layer_Index=L.

In step 1004, the method comprises using $D_{trans}$ as a data source to perform an independence test for all the features in $F_L$ against each of the features in $P_{prime\_list}$. This initial iteration of step 1004 of FIG. 10 corresponds to step 304 of FIG. 3.

In step 1005, the method comprises determining the P-values for each feature in $F_L$ relative to each feature in $P_{prime\_list}$ list based on the chi-squared tests performed in step 1004.

The Chi-Square test of independence evaluates if two variables are related in any way. The formula for calculating a chi-square test is:

$$\chi^2 = \sum \frac{\sum (O_i - E_i)^2}{E_i}$$

where, $\chi^2$=The Chi-Square statistic, $O_i$=Observed $E_i$=Expected

A low value of the chi-square statistic means there is a high correlation between the two sets of data.

A Chi-Square score is the output of a scoring function which takes the Chi-Square statistic as an input and returns univariate scores and P-values. Higher chi-square scores means there is a high correlation between the two sets of data.

The two hypothesis for this test are:

- the Null Hypothesis, which states that two variables are independent or not related to each other; and
- the Alternate Hypothesis, which states that two variables are dependent or related to each other.

The P-value "p", which may be calculated as defined below, helps confirm the Hypothesis for two variables that are being tested.

$p=P(\chi^2 \mathbf{22}\ \chi_c^2|H_0)$ is the formula for the P-value which calculates the probability of the Chi squared score being greater than a critical score, provided the null hypothesis $H_0$ is true where, $\chi_c^2$ is the Critical Value of Chi-Square score.

For example, if the value of p is less than 0.05, then we can reject the null hypothesis, and can say the two features tested for independence are dependent with more than 95% level of confidence.

In step 1006, the method comprises, for each feature in $F_L$, responsive to the P-values of the chi-squared test with each feature in $P_{prime\_list}$ being less than or equal to a predetermined threshold (e.g. $P_{value\_max}$ which may typically be set to 0.05), determining that the two features are dependent. If the P-values is for each pairing between a feature in $F_L$ and features in $P_{prime\_list}$ are all greater than $P_{value\_max}$ the feature is rejected.

In some examples, each feature in $F_L$ that is found to have dependence on at least one feature in $P_{prime\_list}$ is added to a list $F_{L,\ reduced}$.

In step 1007 the method comprises determining if the length of the list $F_{L,\ reduced}$ is >0 (e.g. when the chi-squared test and null hypothesis validation indicates that there is at least one or multiple features in $F_L$ on which $P_{prime\_list}$ list is dependent).

If $F_{L,reduced}$>0 then the method passes to step 1008 in which edges are indicted in the first causal map from the features in $F_{L,\ reduced}$ to the one or more features in $P_{prime\_list}$ that they are dependent on. The direction of the edges is indicated down the hierarchy towards the primary feature.

In step 1009 the value of the parameter L is increased by 1, and in step 1010 the method comprises checking that L is less than or equal to $L_{max}$. For the next iteration, the $P_{prime\_list}$ is set equal to $F_{L,reduced}$ in step 1011. The method may then move on to the next iteration at step 1003.

Figure 11:
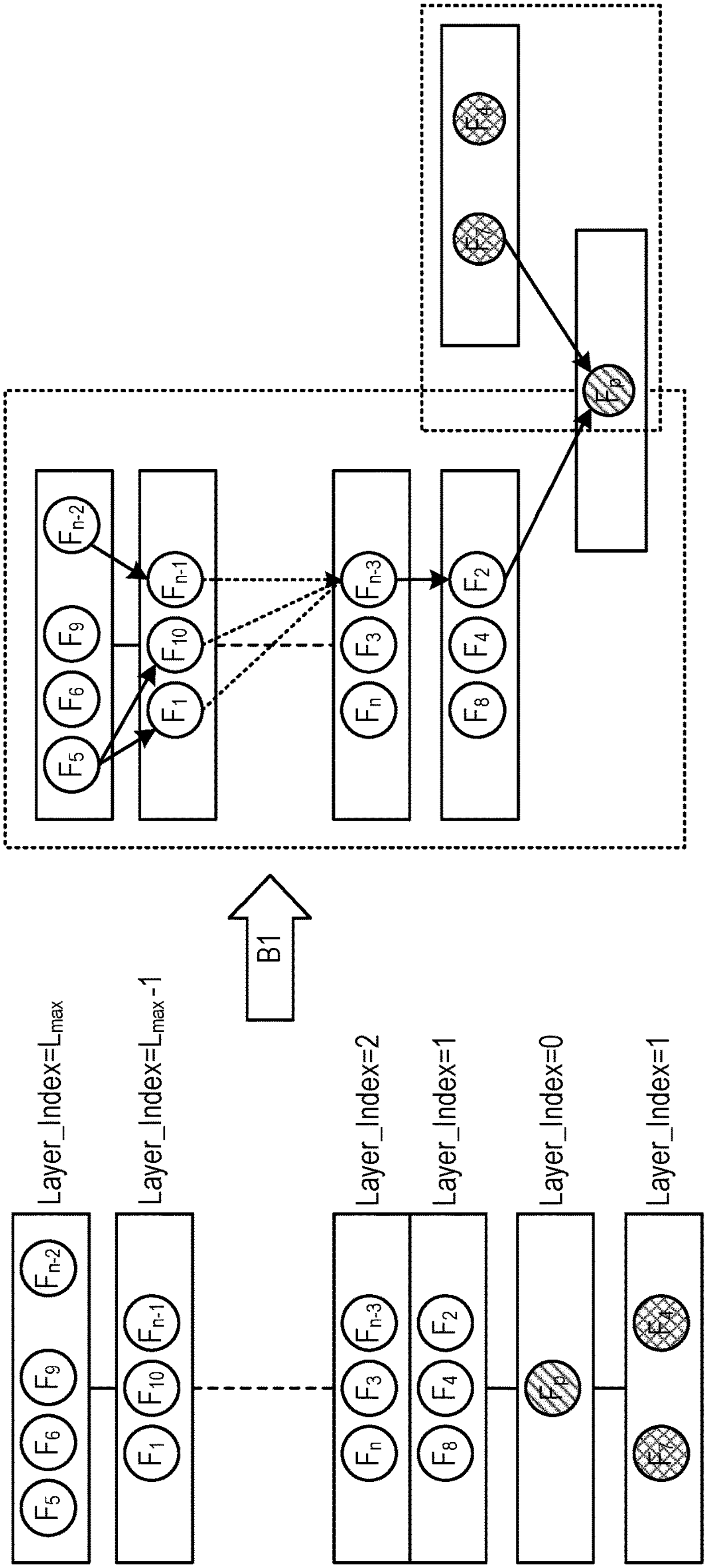
FIG. 11 illustrates an example of a first causal map in accordance with an embodiment.

For example, considering a first iteration for the example grouping of features illustrated in FIG. 8, the dependent relationships in the example first causal map of FIG. 11 may be found. In FIG. 11 edges (e.g. found strong relationships between features) are indicated with arrows. In this example, the feature $F_2$ in group 1 is found to have a dependent relationship on the primary feature $F_p$.

In a second iteration, the step 1004 corresponds to step 306 In FIG. 3. In the example illustrated in FIG. 11, at the second iteration $P_{prime\_list}$ is set to $F_2$ and the features in $F_L$ comprise $F_n$ $F_3$ and $F_{n-3}$. In the illustrated example the only dependence between pairs of features found is between $F_{n-3}$ and $F_2$. Therefore, this is illustrated as an edge in the causal map. $F_{L,\ reduced}$ therefore comprises just $F_{n-3}$ for this iteration. For the third iteration $P_{prime\_list}$=[$F_{n-3}$].

In general at each iteration after the first iteration, for each feature in a second group found to have dependence on at least one feature in a first group below the second group in the hierarchy (e.g $F_{L,reduced}$ from the previous iteration, which is set to $P_{prime\_list}$), the method comprises performing (e.g. at step 1004) the independence test on the first data set (e.g. $D_{trans}$) to determine a relationship between the feature in the second group and each feature in a third group above the second group in the hierarchy.

FIG. 11 does not illustrate all the groups in the hierarchy for clarity (the edges indicated between $F_1$ and $F_{n-3}$, $F_{10}$ and $F_{n-3}$, and $F_{n-1}$ and $F_{n-3}$ would, if all groups were illustrated, be realized via other features in other groups). However, it can be seen from FIG. 11 that pathways are created by the edges extending between the primary group (e.g. $F_p$) and the root cause group.

If at step 1007 it is determined that $F_{L,reduced}$=0, this indicates that no strong relationship has been found between the features in $F_L$ and the features in $P_{prime\_list}$. In this example the method may pass to step 1011, in which the value of the parameter L is increased by 1. In step 1013 $P_{prime\_list}$ in this case is not updated.

The method may then pass back to step 1003, and a new iteration starts.

In other words, responsive to the independence test indicating that there is no dependency between one or more features in a fourth group (e.g. $P_{prime\_list}$) to features in a fifth group above the fourth group of the hierarchy (e.g. $F_L$). At the next iteration, for each of the one or more features in the fourth group (e.g. $P_{prime\_list}$ which is not updated), performing the independence test (at step 1004) on the first data set (e.g. $D_{trans}$) to determine a relationship between the feature in the fourth group and each feature in an sixth group above the fifth group in the hierarchy.

In other words, in some examples, the first causal map may effectively skip one or more groups in the hierarchy is no dependent relationship is found to the previous $F_{L,reduced}$.

Part B of the method of FIG. 10 may be performed in parallel to Part A of the method of FIG. 10.

In step 1014 the method comprises determining the features in the plurality of features that are in the event group, e.g. that have a layer index of −1. For example, a list $F_{L\_event}$ may be derived using $L_{map}$, where $F_{L\_event}$ contains all the features with Layer_Index=−1.

In step 1015, the method comprises using $D_{trans}$ as a data source to perform an independence test for all the features in $F_{L\_event}$ against each of the features in $P_{prime\_list}$ (e.g. $F_p$). In other words, the method comprises for each feature in the event group, performing the independence test on the first data set to determine a relationship between the feature in the event group and the primary feature.

In step 1016, the method comprises determining the P-values for each feature in $F_{L\_event}$ relative to each feature in $P_{prime\_list}$ based on the chi-squared tests performed in step 1015.

In step 1017 the method comprises, for each feature in $F_{L,event}$, responsive to the P-values of the chi-squared test with each feature in $P_{prime\_list}$ being less than or equal to a predetermined threshold (e.g. $P_{value\_max}$ which may typically be set to 0.05), determining that the two features are dependent. If the P-values is for each pairing between a feature in $F_L$ and features in $P_{prime\_list}$ list are all greater than $P_{value\_max}$ the feature is rejected.

In step 1017, the features in $F_{L\_event}$ that are found to have dependence on at least one feature in $P_{prime\_list}$ may be added to a list $F_{L,event,reduced}$.

In step 1018 the method comprise determining if the length of $F_{L,event,reduced}$ is greater than 0.

Responsive to $F_{L,event,reduced}$ being equal to 0, the method passes to step 1019 in which no further action is taken. In other words, it may be concluded that there is no features in the event group that have strong relationships with any features in $P_{prime\_list}$.

Response to $F_{L,event,reduced}$ being greater than 0 (e.g. the Chi-squared test and null hypothesis validation indicates that there is at least one feature in $F_{L,event,reduced}$ reduced on which $P_{prime\_list}$ is strongly dependent) the method passes to step 1020 in which edges are indicted in the first causal map from the features in $F_{L,event,reduced}$ to the one or more features in $P_{prime\_list}$ that they are found to have a dependence on.

In the example illustrated in FIG. 11, the event group comprises the features $F_7$ and $F_4$. In this example, a dependent relationship is found between $F_7$ and $F_4$.

In step 1021, the method may comprise, responsive to the independence test indicating that two features have a dependent relationship, calculating a correlation factor between the two features. For example, a correlation factor may be determined for each edge indicated in the first causal map. The correlation factor "r" between two features "x" and "y" may be calculated as:

$$r = \frac{n\left(\sum xy\right) - \left(\sum x\right)\left(\sum y\right)}{\sqrt{\left[n\sum x^2 - \left(\sum x\right)^2\right]\left[n\sum y^2 - \left(\sum y\right)^2\right]}},$$

where n is the number of pairs of data.

In step 1022, the method may comprise removing any indication of dependence between two features from the first causal map responsive to either: both features being either positive or negative oriented features and the correlation factor between the two features being negative; or one of the two features being a positive oriented feature and the other of the two features being a negative oriented feature, and the correlation factor between the two features being positive. As previously mentioned, the category of a feature (e.g. whether it has a positive or negative orientation) may be indicated in $L_{map}$.

These edges are removed from the first causal map as each of the conditions mentioned above makes a relationship statistically inconsequential.

In step 1023 the method comprises: determining a strength (or weight) of each edge in the first causal map as a normalized chi-squared score for the two features forming the edge multiplied by a sign of the correlation factor between the two features.

For example, the strength of an edge (Se) in the first causal map may be calculated as:

$$Se = \frac{Chi_{square} \text{ score of the feature}}{\text{Max of } Chi_{square} \text{ score of all the features at the layer}} * \frac{\text{Correlation Factor}}{\text{Abs (Correlation Factor)}}$$

In step 1024, all of the edges indicated in the first causal map are annotated with their respective strengths as calculated in step 1023.

Returning to FIG. 4, as will be explained further later, step 406 may output more than one causal map.

In step 407 the method may therefore comprise aggregating the causal maps ($CN_i$) output by step 407. For example, if a first causal map is first output by step 406, step 407 may comprise adding any edges indicated by any further causal maps that are not indicated in the first causal map, to the first causal map.

In step 408, the method comprises determining if any features are present in last output causal map that represent a network performance event (e.g. that have a layer index of −1 and/or that are in the event group).

If the last output causal map does comprise at least one feature that represents a network performance event the method passes to step 409 in which $P_{prime\_list}$ is set to contain the at least one feature that represents a network performance event in the last output causal map. This new $P_{prime\_list}$ is then fed back into step 405 of the method, and steps 405 to 408 are repeated, thereby generating any further causal networks.

In other words, after determining the first causal map (e.g. at step 406), the method comprises for each feature in the event group found to have a dependent relationship to the primary feature, determining a second causal map for root cause analysis of an event represented by the feature in the event group (e.g. at another iteration of step 406); and updating the first causal map with pathways in the second causal map (e.g. at step 407).

If in step 408 it is determined that the last output causal map does not comprise at least one feature that represents a network performance event, the method passes to step 410 in which, in some examples, the aggregated causal map (or updated first causal map) is then analyzed to determine all the pathways meeting one or more of the following conditions: a pathway that start with a node with zero in-bound edges; and a pathway that ends with a node with zero out-bound edges.

For each of the paths found to meet the above conditions (or for all pathways), the strength (or weight) of a pathway may be determined as: a mean of the strengths of the edges in the pathway.

For example, the strength of a pathway may be calculated as:

$$S_{mean} = \left(\sum |S_i|\right)/e_n,$$

Where $S_i$ is the strength of the edge i in the pathways, $e_n$ is the number of edges in pathway, and i=1, 2, . . . , $e_n$.

In some examples step 410 further comprises filtering the first causal map to maintain only a maximum number of pathways, wherein the maintained pathways have the highest strengths. The maximum number of pathways $S_{path\_max}$ may comprise a user-defined variable.

With the completion of step 410, a final aggregated causal map is generated for root cause analysis of the primary event represented by the primary feature $F_p$.

FIGS. 12 to 19 illustrate an example implementation of the methods of FIGS. 3, 4 and 10.

In this example the method is initiated with the primary feature "AUDIO_GAP_MS" as $F_p$ which indicates the duration of VOLTE call muting in milliseconds. The end goal of the proposed method is to derive a causal map that can explain the underlying reasons behind the observed high values in AUDIO_GAP_MS.

At the first iteration of Part A of FIG. 10, with L=1 and $P_{prime}$=AUDIO_GAP_MS, the features listed below in table 2 are evaluated as part of $F_L$. In this example $P_{value\_max}$ was set to 0.05. Based on the evaluation steps mentioned in Part A of FIG. 10 and subsequent steps, only one feature, "DL_PACKET_ERROR_UU_QCI1_%" is selected at Layer_Index=1 for $F_{L,reduced}$ in the first iteration.

TABLE 2

| Feature | Chi2 Score | Pvalue | Correlation Factor | Feature Category | $P_{prime}$ Category | Selection | Strength |
|---|---|---|---|---|---|---|---|
| DL_PACKET_ERROR_UU_QCI1_% | 22.322 | 0.000 | 0.265 | 0 | 0 | TRUE | 1.000 |
| VOLTE_INTEGRITY_RB_% | 0.948 | 0.331 | −0.057 | 1 | 0 | FALSE | −0.042 |
| UL_PACKET_ERROR_RATE_% | 0.774 | 0.380 | 0.051 | 0 | 0 | FALSE | 0.035 |
| DL_PACKET_ERROR_PELR_QCI1_% | 0.324 | 0.570 | −0.033 | 0 | 0 | FALSE | −0.015 |
| DL_PACKET_ERROR_HO_QCI1_% | 0.265 | 0.607 | −0.030 | 0 | 0 | FALSE | −0.012 |
| DL_LATENCY_QCI1_MS | 0.122 | 0.728 | 0.020 | 0 | 0 | FALSE | 0.005 |

Figure 12:
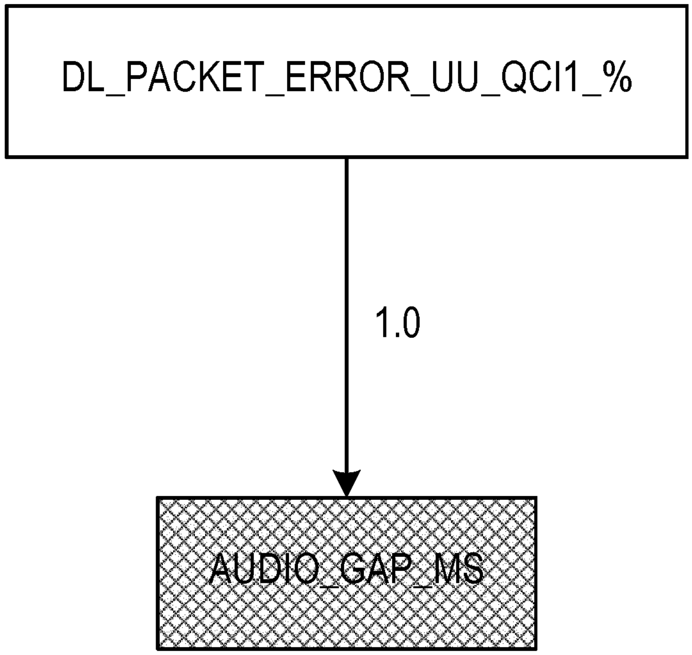
FIG. 12 illustrates a step in the generation of a causal map in accordance with an embodiment.

This leads to the indication of one edge between "DL_PACKET_ERROR_UU_QCI1_%" and "AUDIO_GAP_MS" in the first causal map, as illustrated in FIG. 12.

In the second iteration of Part A of FIG. 10, with L=2 and $P_{prime\_list}$=[DL_PACKET_ERROR_UU_QCI1_%], features from next adjacent layer are evaluated as illustrated in Table 3 below.

TABLE 3

| FEATURE | CHI2_SCORE | PVALUE | CORRELATION FACTOR | FEATURE CATEGORY | $P_{prime}$ CATEGORY | SELECTION | STRENGTH |
|---|---|---|---|---|---|---|---|
| DL_HARQ_FAIL_RATE_% | 6.431 | 0.012 | 0.146 | 0 | 0 | TRUE | 1.000 |

In the third iteration, with L=3 and $P_{prime\_list}$=[DL_HARQ_FAIL_RATE_%], the features from next adjacent layer are evaluated as illustrated in Table 4 below.

TABLE 4

| FEATURE | CHI2_SCORE | PVALUE | CORRELATION FACTOR | FEATURE CATEGORY | $P_{prime}$ CATEGORY | SELECTION | STRENGTH |
|---|---|---|---|---|---|---|---|
| AVERAGE_DL_SE_TTI_# | 108.808 | 0.000 | 0.519 | 0 | 0 | TRUE | 1.000 |
| PUSCH_SINR_BELOW_−2DB_RATE_% | 68.130 | 0.000 | 0.433 | 0 | 0 | TRUE | 0.626 |
| PDCCH_CCE_AGGREGATION_# | 49.341 | 0.000 | 0.379 | 0 | 0 | TRUE | 0.453 |
| UL_PRB_UTILIZATION_% | 35.401 | 0.000 | −0.327 | 0 | 0 | FALSE | −0.325 |
| AVERAGE_PUSCH_SINR_DB | 32.160 | 0.000 | −0.314 | 1 | 0 | TRUE | −0.296 |
| PDCCH_CCE_UTILIZATION_% | 22.499 | 0.000 | −0.266 | 0 | 0 | FALSE | −0.207 |
| DL_PRB_UTILIZATION_% | 16.540 | 0.000 | −0.230 | 0 | 0 | FALSE | −0.152 |
| AVERAGE_CQI_DB | 8.148 | 0.005 | 0.164 | 1 | 0 | FALSE | 0.075 |
| AVERAGE_PUCCH_SINR_DB | 7.660 | 0.006 | −0.159 | 1 | 0 | TRUE | −0.070 |
| PUCCH_SINR_BELOW_−3DB_RATE_% | 4.341 | 0.038 | 0.120 | 0 | 0 | FALSE | 0.040 |
| RANK_DISTR_TM4R4_% | 3.658 | 0.057 | −0.111 | 1 | 0 | FALSE | −0.034 |
| AVERAGE_UL_SE_TTI_# | 2.330 | 0.128 | −0.089 | 0 | 0 | FALSE | −0.021 |
| CELL_CCE_UTILIZATION_% | 1.301 | 0.255 | −0.066 | 0 | 0 | FALSE | −0.012 |
| BAD_EVAL_SAMPLES_% | 1.117 | 0.291 | 0.061 | 0 | 0 | FALSE | 0.010 |
| UL_POWER_RESTRICTED_USERS_% | 0.033 | 0.857 | −0.011 | 0 | 0 | FALSE | 0.000 |

Figure 13:
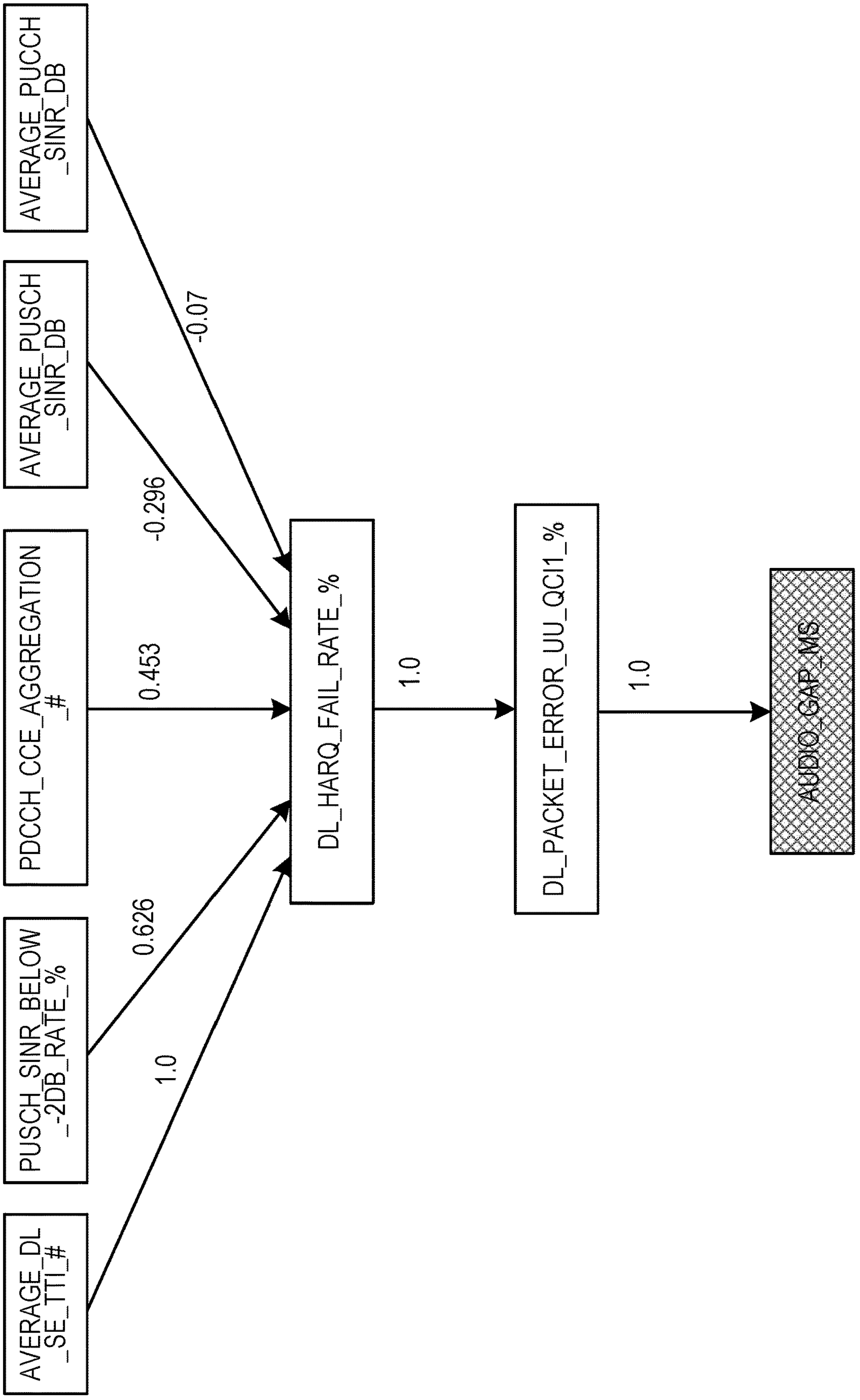
FIG. 13 illustrates a step in the generation of a causal map in accordance with an embodiment.

After the second and third iteration and subsequent steps, this example yields the edges illustrated in FIG. 13

Figure 14:
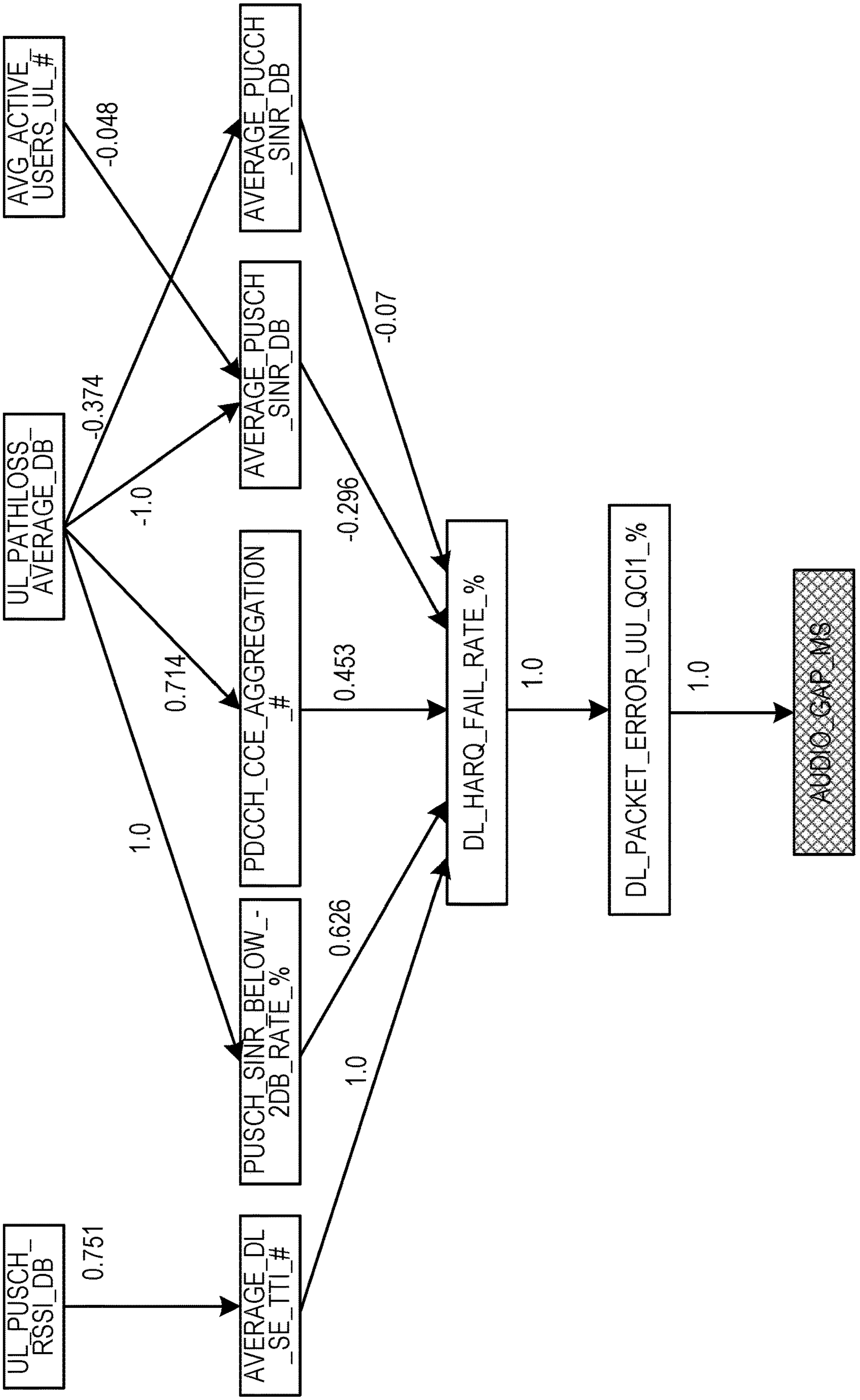
FIG. 14 illustrates a step in the generation of a causal map in accordance with an embodiment.

After all the iterations of Part A of FIG. 10 until L<=$L_{max}$, the causal map illustrated in FIG. 14 may be generated.

In part B of the method of FIG. 10, the features with a layer index of −1 are evaluated against $P_{prime\_list}$=AUDIO_GAP_MS. This results in the edge illustrated in FIG. 15.

Figure 15:
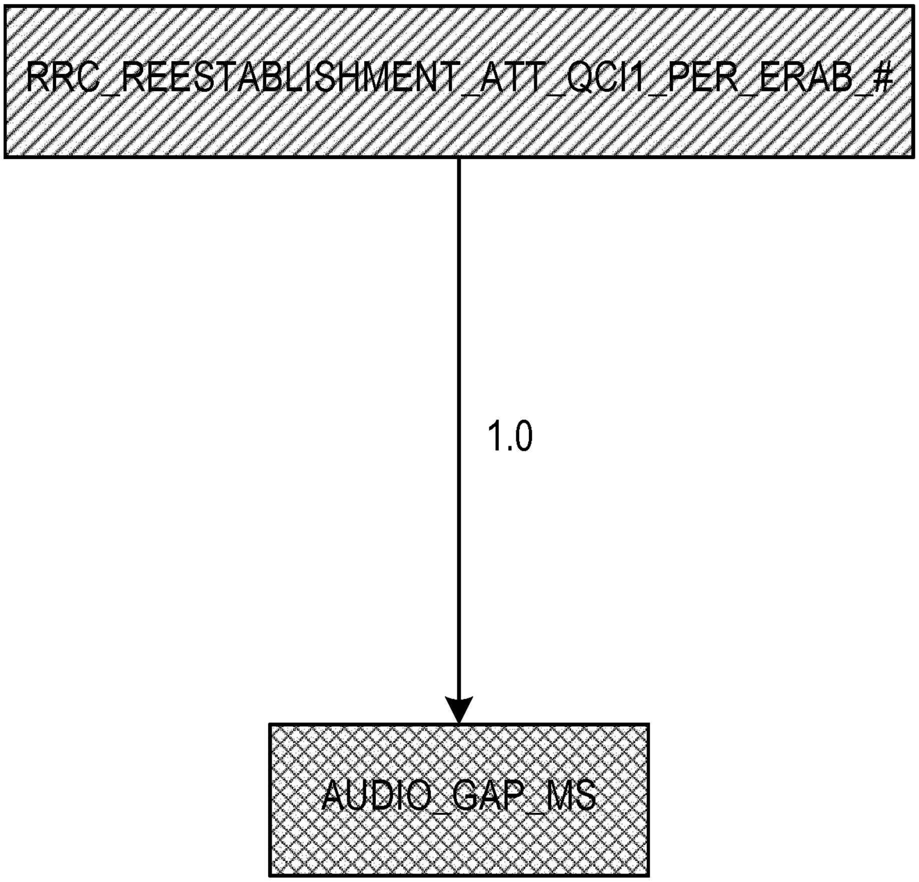
FIG. 15 illustrates a step in the generation of a causal map in accordance with an embodiment.
Figure 16:
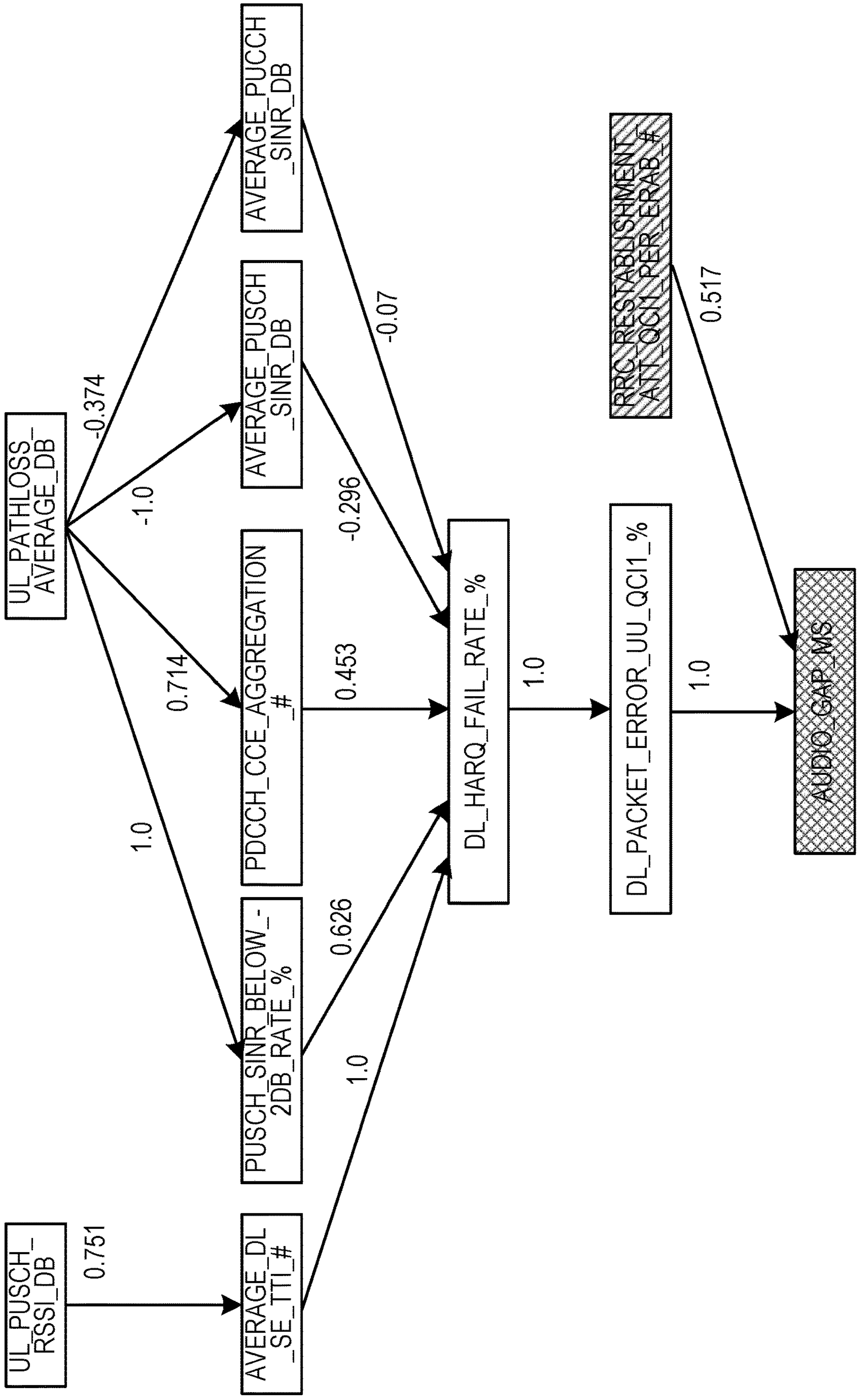
FIG. 16 illustrates a step in the generation of a causal map in accordance with an embodiment.
Figure 17:
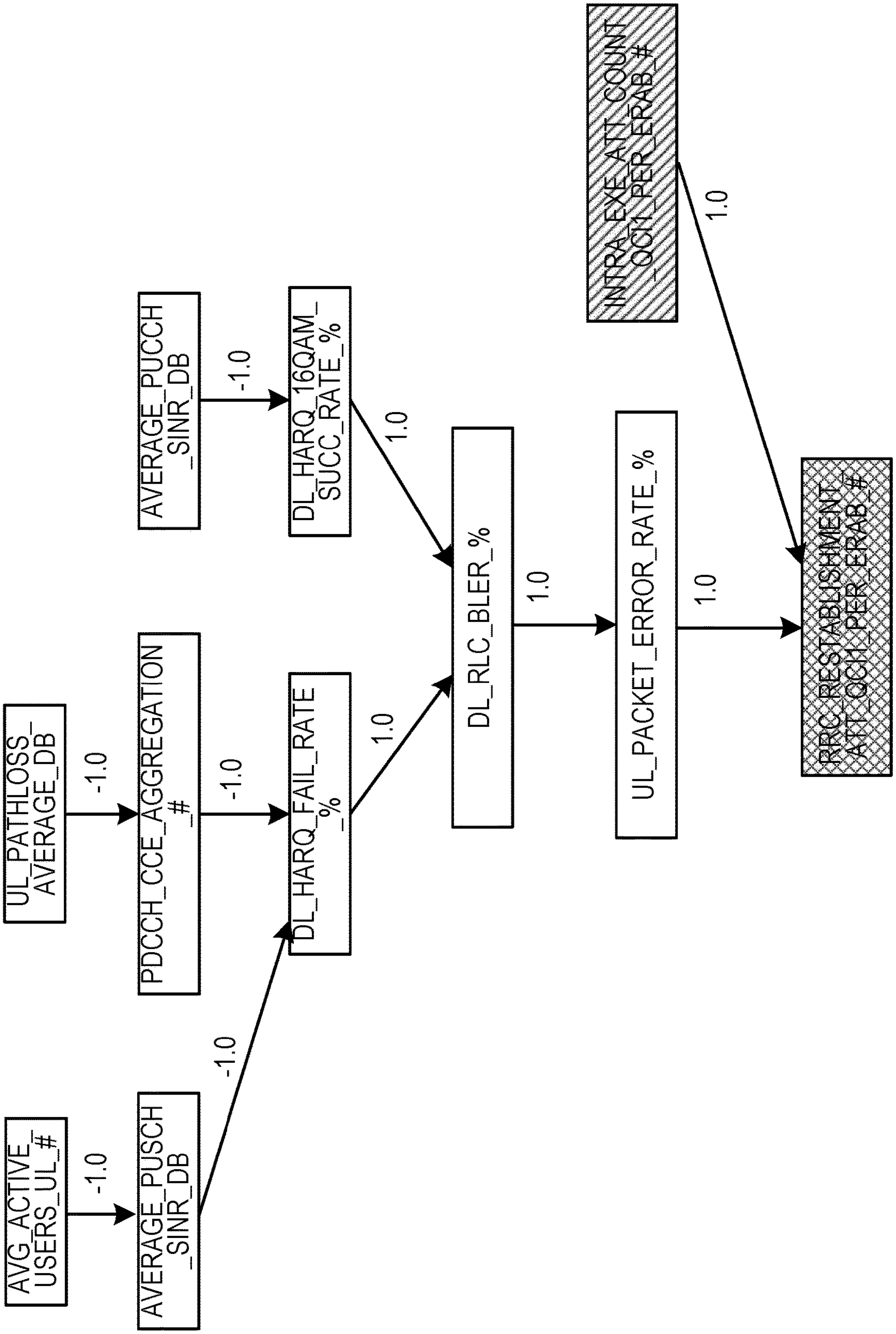
FIG. 17 illustrates a step in the generation of a causal map in accordance with an embodiment.

The edges from FIGS. 14 and 15 are then are combined to generate an aggregated causal map as illustrated in FIG. 16.

At step 408 of FIG. 4 it is therefore found that there is one feature with a layer index of −1 in the causal map of FIG. 16. Therefore, $P_{prime\_list}$ is set as $P_{prime\_list}$=[RRC_REESTABLISHMENT_ATT_QCI1_PER_ERAB_#] in step 409 of FIG. 4. Steps 405 to 408 of FIG. 4 are then repeated resulting the causal map illustrated in FIG. 17.

The steps 405 to 409 of FIG. 4 may then be repeated for as many iterations as required until all the features with a layer index of =−1 are evaluated against respective $P_{prime\_list}$ from the last output causal map from step 406 of FIG. 4. For illustration purposes, the causal map of FIG. 17 has been considered without further iteration considering INTRA_EXE_ATT_COUNT_QCI1_PER_ERAB # as the as $P_{prime\_list}$.

Figure 18:
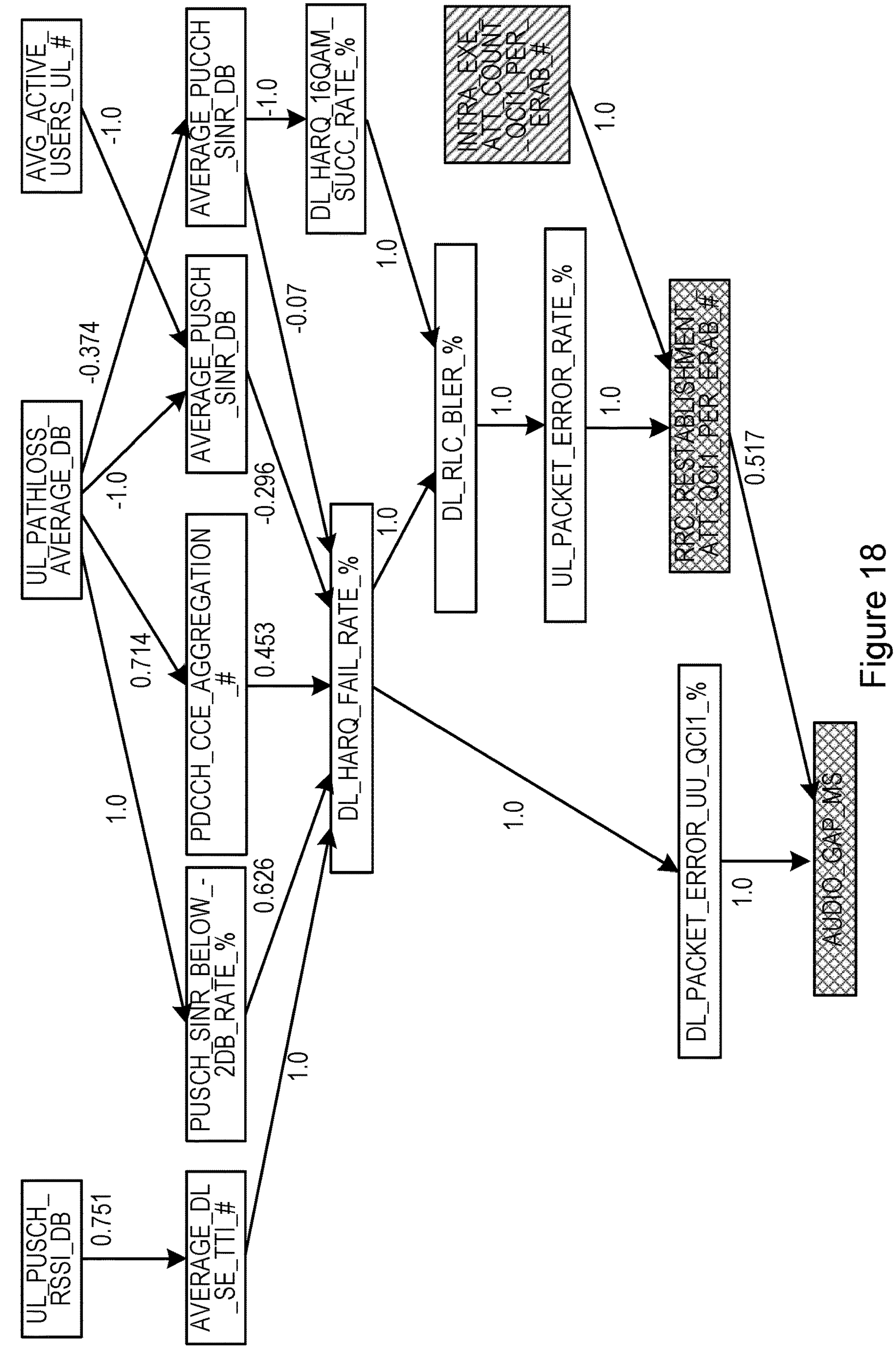
FIG. 18 illustrates a step in the generation of a causal map in accordance with an embodiment.

In the next stage, all the causal maps output from step 406 of FIG. 4 (e.g. FIG. 16 and FIG. 17) are aggregated to form a single causal map as illustrated in FIG. 18.

Figure 19:
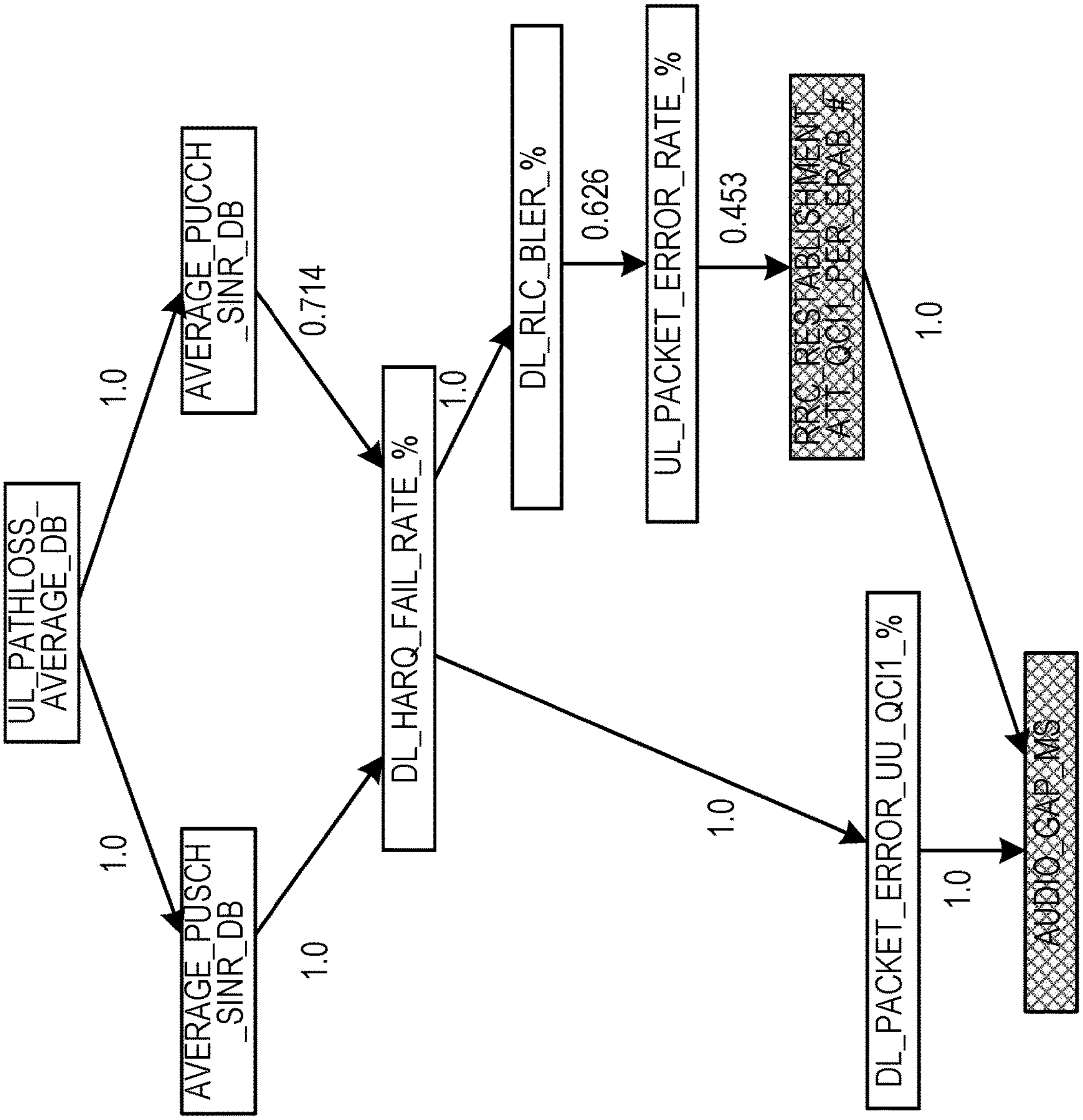
FIG. 19 illustrates a step in the generation of a causal map in accordance with an embodiment.

In this example, the value of $S_{path\_max}$ is set to 2. Therefore, as illustrated in FIG. 19, the two strongest paths may be filtered from the causal map illustrated in FIG. 18.

Figure 20:
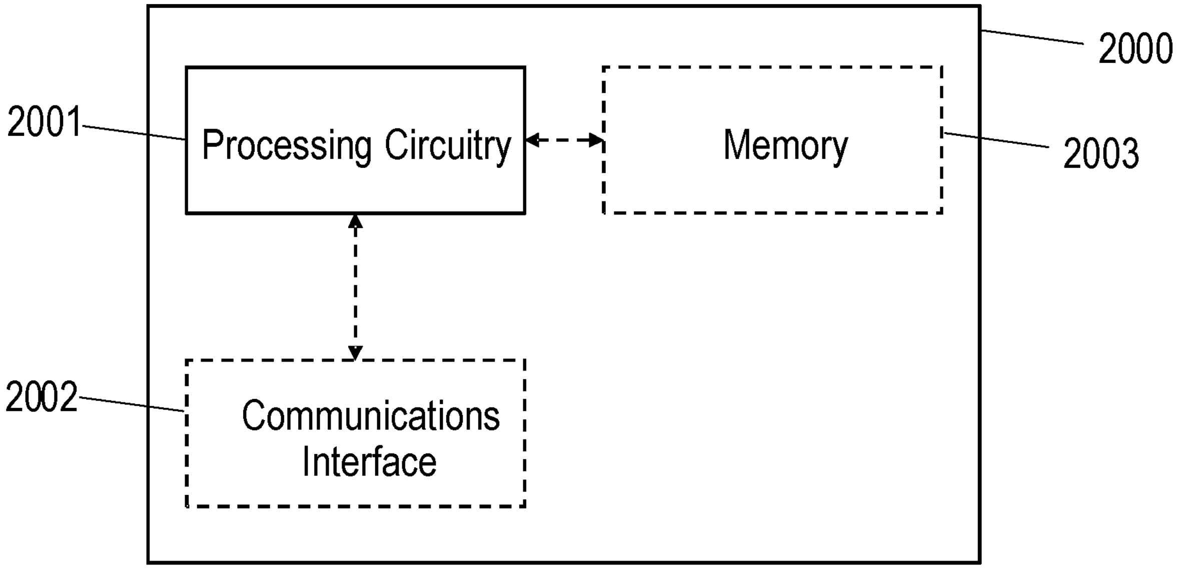
FIG. 20 illustrates an apparatus=comprising processing circuitry (or logic) in accordance with an embodiment.

FIG. 20 illustrates an apparatus 2000 comprising processing circuitry (or logic) 2001. The processing circuitry 2001 controls the operation of the apparatus 2000 and can implement the method described herein in relation to an apparatus 2000. The processing circuitry 2001 can comprise one or more processors, processing units, multi-core processors or modules that are configured or programmed to control the apparatus 2000 in the manner described herein. In particular implementations, the processing circuitry 2001 can comprise a plurality of software and/or hardware modules that are each configured to perform, or are for performing, individual or multiple steps of the method described herein in relation to the apparatus 2000.

Briefly, the processing circuitry 2001 of the apparatus 2000 is configured to: obtain a first data set, wherein each entry in the first data set comprises values of a plurality of features representative of the network environment, wherein the plurality of features comprises a primary feature representative of the primary event; for each first feature in a first subset of the plurality of features, perform an independence test on the first data set to determine a relationship between the first feature and the primary feature; for each first feature in the first subset for which the independence test indicates a dependent relationship to the primary feature, perform the independence test on the first data set to determine a relationship between the first feature and each second feature in a second subset of the plurality of features; and based on results of the steps of performing the independence test, determine one or more pathways in the first causal map between at least one root cause for the primary event and the primary feature.

In some embodiments, the apparatus 2000 may optionally comprise a communications interface 2002. The communications interface 2002 of the apparatus 2000 can be for use in communicating with other nodes, such as other virtual nodes. For example, the communications interface 2002 of the apparatus 2000 can be configured to transmit to and/or receive from other nodes requests, resources, information, data, signals, or similar. The processing circuitry 2001 of apparatus 2000 may be configured to control the communications interface 2002 of the apparatus 2000 to transmit to and/or receive from other nodes requests, resources, information, data, signals, or similar.

Optionally, the apparatus 2000 may comprise a memory 2003. In some embodiments, the memory 2003 of the apparatus 2000 can be configured to store program code that can be executed by the processing circuitry 2001 of the apparatus 2000 to perform the method described herein in relation to the apparatus 2000. Alternatively or in addition, the memory 2003 of the apparatus 2000, can be configured to store any requests, resources, information, data, signals, or similar that are described herein. The processing circuitry 2001 of the apparatus 2000 may be configured to control the memory 2003 of the apparatus 2000 to store any requests, resources, information, data, signals, or similar that are described herein.

Figure 21:
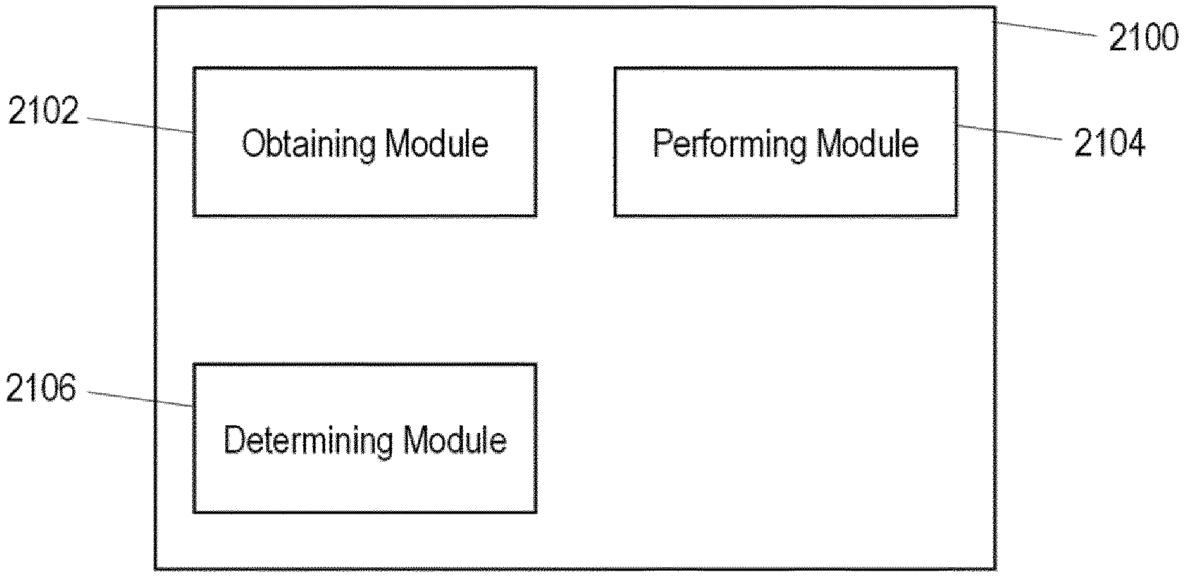
FIG. 21 is a block diagram illustrating an apparatus in accordance with an embodiment.

FIG. 21 is a block diagram illustrating an apparatus 2100 in accordance with an embodiment. The apparatus 2100 can determine a first causal map for the root cause analysis of a primary event in a network environment. The apparatus 2100 comprises an obtaining module 2102 configured to obtain a first data set, wherein each entry in the first data set comprises values of a plurality of features representative of the network environment, wherein the plurality of features comprises a primary feature representative of the primary event. The apparatus 2100 comprises a performing module 2104 configured to: for each first feature in a first subset of the plurality of features, performing an independence test on the first data set to determine a relationship between the first feature and the primary feature; and for each first feature in the first subset for which the independence test indicates a dependent relationship to the primary feature, performing the independence test on the first data set to determine a relationship between the first feature and each second feature in a second subset of the plurality of features. The apparatus 2100 comprises a determining module 2106 configured to, based on results of the steps of performing the independence test, determining one or more pathways in the first causal map between at least one root cause for the primary event and the primary feature. The apparatus 2100 may operate in the manner described herein in respect of an apparatus.

There is also provided a computer program comprising instructions which, when executed by processing circuitry (such as the processing circuitry 501 of the AMF 500 described earlier, cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein therefore provide a statistical method that may map the plurality of features representative of a network environment (e.g. key performance indicators) into a hierarchical. The embodiments described herein illustrate a versatile capability to find out associative causality between the events/failures with various types of information in order to assist in root cause investigation of the problem.

Embodiments described herein may for example, involve analyzing the different variables or the indicators available (e.g. in the form of PM counters, Drive-test metrics, CM, and PM Events) with an independence test such as the Chi-Squared test for independence. Such a test may test the degree of dependency of the variables with the abnormal event to establish the probable impacts/impactors. A threshold criterion introduced in some examples, provides control of the vastness of the search of different variables, and thereby controls the breadth and height of the output causal map. To eliminate any spurious dependency or out-of-scope factors mimicking dependency of the wrong direction, a correlation factor may also be considered. By combining the statistical insights and results scientifically, an integrated score may be derived to weigh the impacts and impactors' relationships. Such comprehensive investigation may be carried out for different variables from every level of the N-level hierarchy to which they are mapped, to create an insightful causal network graph.

The causal map generated by embodiments described herein thus helps in explaining the underlying reasons behind a given decision, which is again is the key behind the determination of the most appropriate and efficient solution to the problem under investigation.

Embodiments described herein do not require explicit information on whether two variables share a relationship and the direction of the relationship i.e. the cause-effect relation between the two variables. By simply arranging the different variables as per the proposed hierarchy, embodiments described herein find the presence of dependency between two variables and establishes the causality direction as well. Also, the strength (e.g. the importance of the contribution of a cause to the effect) is measured stating the comparative influences of a cause in a particular level. This removes the dependency on deep domain expertise and dependency on costly real-time or near real-time time-series data.

Some embodiments described herein are based on a multi-level hierarchical architecture where levels depict the performance across different standardized protocols of respective technology/domain. The hypothesis test yields to terminal root cause along with the identification of intermediate impactors or causes which also have an indirect effect on the abnormal event or failure under investigation. This helps to explain the underlying cause of the inference and provides multiple opportunities to resolve the problem.

Embodiments described herein help to determine the confounder variables, statistically and not depending too much on domain knowledge, from the plurality of the features available in the dataset. This enables the further application of the derived causal map for accurate decision-making.

To eliminate any spurious dependency or out-of-scope intermediate factors that may imitate dependency for the problem under investigation, but in the wrong orientation or direction, a correlation factor may be considered in some embodiments. This helps in refining the statistical analysis to identify the appropriate terminal and intermediate features.

The flexibility of the proposed architecture and dependency only on the standard domain-side information makes the solution agnostic of technology (4G,5G, etc.), vendor, and domain (RAN, PS Core, CS Core, IMS Core, Transport Network, etc.).

The first causal map generated by the embodiments described herein may be applied and extended to various network performance analyses, root cause analysis investigation, causal network-based inference, etc., in an automated fashion with minimal dependency on deep domain expertise and well established prior knowledge.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, implemented in an apparatus, for determining a first causal map for the root cause analysis of a primary event in a network environment, the method comprising:

obtaining a first data set, wherein each entry in the first data set comprises values of a plurality of features representative of the network environment, wherein the plurality of features comprises a primary feature representative of the primary event;

for each first feature in a first subset of the plurality of features, performing an independence test on the first data set to determine a relationship between the first feature and the primary feature representative of the primary event;

for each first feature in the first subset for which the independence test indicates a dependent relationship to the primary feature, performing the independence test on the first data set to determine a relationship between the first feature and each second feature in a second subset of the plurality of features;

based on results of the steps of performing the independence test, determining one or more pathways in the first causal map between at least one root cause for the primary event and the primary feature, wherein at least one pathway comprises at least one intermediate feature between the primary event and a root cause for the primary event; and grouping the plurality of features into a plurality of non-overlapping groups, wherein at least two or more of the plurality of non-overlapping groups are arranged into a hierarchy, the hierarchy starts with a primary group comprising the primary feature and ends with a root cause group comprising one or more suspected root causes for the primary feature, and the first subset of the plurality of features is associated with a first group, and the second subset of the plurality of features is associated with a second group.

2. The method as claimed in claim 1, further comprising:

responsive to occurrence of the primary event, determining one or more actions to perform in the network environment to resolve the occurrence of the primary event based on the first causal map; and determining one or more actions based on at least in part on the at least one intermediate feature in the one or more pathways.

3. The method as claimed in claim 1, further comprising:

responsive to the steps of performing the independence test indicating that two features in the plurality of features have a dependent relationship, indicating a dependent relationship between the two features as an edge in the first causal map.

4. The method as claimed in claim 1, wherein the step of grouping comprises:

grouping the plurality of features based at least in part on which layer in a protocol stack is associated with each feature;

assigning any feature in the plurality of features that is suspected as a probable root cause for the primary event a maximum layer index; and the step of grouping comprises assigning a layer index of 0 to the primary feature.

5. The method as claimed in claim 1, wherein the step of grouping comprises:

assigning any feature in the plurality of features that is representative of network performance events to an event group, wherein the event group is not in the hierarchy; and assigning a layer index of −1 to any features that are representative of network performance events.

6. The method as claimed in claim 4, wherein the step of grouping comprises:

for all other features in the plurality of features, assigning a layer index between 1 and one less than a maximum layer index based on which layer in a protocol stack is associated with the feature, and the first subset of the plurality of features is associated with a layer index of 1 and the second subset of the plurality of features is associated with a layer index of 2.

7. The method as claimed in claim 1, further comprising: for each feature in a second group found to have dependence on at least one feature in a first group below the second group in the hierarchy, performing the independence test on the first data set to determine a relationship between the feature in the second group and each feature in a third group above the second group in the hierarchy.

8. The method as claimed in claim 7 further comprising:

responsive to the independence test indicating that there is no dependency between one or more features in a fourth group to features in a fifth group above the fourth group of the hierarchy, for each of the one or more features in the fourth group, performing the independence test on the first data set to determine a relationship between the feature in the fourth group and each feature in a sixth group above the fifth group in the hierarchy.

9. The method as claimed in claim 7, further comprising:

for each feature in the event group, performing the independence test on the first data set to determine a relationship between the feature in the event group and the primary feature, wherein the step of grouping comprises assigning any feature in the plurality of features that is representative of network performance events to an event group, wherein the event group is not in the hierarchy.

10. The method as claimed in claim 1, wherein performing the independence test to determine a relationship between two features comprises performing a chi-squared test for independence, and responsive to a P-value of the chi-squared test being less than or equal to a predetermined threshold, determining that the two features are dependent.

11. The method as claimed in claim 1, wherein performing the independence test to determine a relationship between two features comprises performing an F-test for independence or a G-test for independence.

12. The method as claimed in claim 1, further comprising:

responsive to the independence test indicating that two features have a dependent relationship, calculating a correlation factor between the two features; and categorizing each of the plurality of features as a positive or negative oriented feature based on whether each feature would be considered better if observed with a higher value or a lower value.

13. The method as claimed in claim 12 further comprising:

removing any indication of dependence between two features from the first causal map responsive to either:

both features being either positive or negative oriented features and the correlation factor between the two features being negative; or one of the two features being a positive oriented feature and the other of the two features being a negative oriented feature, and the correlation factor between the two features being positive.

14. The method as claimed in claim 9 further comprising:

for each feature in the event group found to have a dependent relationship to the primary feature, determining a second causal map for root cause analysis of an event represented by the feature in the event group; and updating the first causal map with pathways in the second causal map.

15. The method as claimed in claim 12, further comprising:

determining one or more actions based on at least in part on the at least one intermediate feature in the one or more pathways;

determining a strength of each edge in the first causal map as a normalized chi-squared score for the two features forming the edge multiplied by a sign of the correlation factor between the two features;

for each pathway in the first causal map, determining the strength of the pathway as a mean of the strengths of the edges in the pathway; and filtering the first causal map to maintain only a maximum number of pathways, wherein the maintained pathways have the highest strengths, wherein performing the independence test to determine a relationship between two features comprises performing a chi-squared test for independence.

16. The method as claimed in claim 1, wherein the plurality of features comprise one or more of: key performance indicators;

configuration data; alarm information and fault management data, and the network environment comprises one of: a radio access network, a core network, and a cloud network.

17. An apparatus for determining a first causal map for the root cause analysis of a primary event in a network environment, the apparatus comprising processing circuitry configured to cause the apparatus to:

obtain a first data set, wherein each entry in the first data set comprises values of a plurality of features representative of the network environment, wherein the plurality of features comprises a primary feature representative of the primary event;

for each first feature in a first subset of the plurality of features, perform an independence test on the first data set to determine a relationship between the first feature and the primary feature;

for each first feature in the first subset for which the independence test indicates a dependent relationship to the primary feature, perform the independence test on the first data set to determine a relationship between the first feature and each second feature in a second subset of the plurality of features;

based on results of the steps of performing the independence test, determine one or more pathways in the first causal map between at least one root cause for the primary event and the primary feature, wherein at least one pathway comprises at least one intermediate feature between the primary event and a root cause for the primary event; and group the plurality of features into a plurality of non-overlapping groups, wherein at least two or more of the plurality of non-overlapping groups are arranged into a hierarchy, the hierarchy starts with a primary group comprising the primary feature and ends with a root cause group comprising one or more suspected root causes for the primary feature, and the first subset of the plurality of features is associated with a first group, and the second subset of the plurality of features is associated with a second group.

18. A non-transitory computer readable storage medium storing a computer program for determining a first causal map for the root cause analysis of a primary event in a network environment, the computer program comprising computer code which, when run on processing circuitry of an apparatus, causes the apparatus to:

obtain a first data set, wherein each entry in the first data set comprises values of a plurality of features representative of the network environment, wherein the plurality of features comprises a primary feature representative of the primary event;

for each first feature in a first subset of the plurality of features, perform an independence test on the first data set to determine a relationship between the first feature and the primary feature;

for each first feature in the first subset for which the independence test indicates a dependent relationship to the primary feature, perform the independence test on the first data set to determine a relationship between the first feature and each second feature in a second subset of the plurality of features;

based on results of the steps of performing the independence test, determine one or more pathways in the first causal map between at least one root cause for the primary event and the primary feature, wherein at least one pathway comprises at least one intermediate feature between the primary event and a root cause for the primary event; and group the plurality of features into a plurality of non-overlapping groups, wherein at least two or more of the plurality of non-overlapping groups are arranged into a hierarchy, the hierarchy starts with a primary group comprising the primary feature and ends with a root cause group comprising one or more suspected root causes for the primary feature, and the first subset of the plurality of features is associated with a first group, and the second subset of the plurality of features is associated with a second group.

* * * * *